(12) United States Patent
Mathe et al.

(10) Patent No.: US 10,859,463 B2
(45) Date of Patent: Dec. 8, 2020

(54) METHOD FOR FORMING AND/OR TESTING A BAG IN THE INTERIOR SPACE OF A CONTAINER

(71) Applicant: Boehringer Ingelheim International GmbH, Ingelheim am Rhein (DE)

(72) Inventors: Gerald Mathe, Ingelheim am Rhein (DE); Carlos-Manuel Costa Pereira-Kirchwehm, Ingelheim am Rhein (DE)

(73) Assignee: BOEHRINGER INGELHEIM INTERNATIONAL GMBH, Ingelheim am Rhein (DE)

( * ) Notice: Subject to any disclaimer, the term of this patent is extended or adjusted under 35 U.S.C. 154(b) by 0 days.

(21) Appl. No.: 16/335,365

(22) PCT Filed: Sep. 22, 2017

(86) PCT No.: PCT/EP2017/025267
§ 371 (c)(1),
(2) Date: Mar. 21, 2019

(87) PCT Pub. No.: WO2018/054551
PCT Pub. Date: Mar. 29, 2018

(65) Prior Publication Data
US 2019/0285508 A1 Sep. 19, 2019

(30) Foreign Application Priority Data
Sep. 26, 2016 (DE) .................................. 160 20 352

(51) Int. Cl.
*G01M 3/32* (2006.01)
*B29C 49/80* (2006.01)
(Continued)

(52) U.S. Cl.
CPC .......... *G01M 3/3263* (2013.01); *B29C 48/00* (2019.02); *B29C 49/00* (2013.01);
(Continued)

(58) Field of Classification Search
CPC ..... B32B 43/006; G01M 3/146; G01M 3/147; G01M 3/3218; G01M 3/3263;
(Continued)

(56) References Cited

U.S. PATENT DOCUMENTS

| 4,185,758 A | 1/1980 | Giggard |
| 5,029,464 A * | 7/1991 | Lehmann ............. B07C 5/3408 73/49.3 |

(Continued)

FOREIGN PATENT DOCUMENTS

| AU | 2014355544 A1 | 6/2016 |
| DE | 2438298 A1 | 2/1975 |

(Continued)

OTHER PUBLICATIONS

International Preliminary Report on Patentability and Written Opinion for corresponding PCT Application No. PCT/EP2017/025267, 17 pages, dated Apr. 4, 2019.
Eder F X: "Modeme Messmethoden der Physik. Teil 1 Mechanik-Akustik. Volumenometer, Passage", Hochschulbücher für Physik, XX, XX, Bd. 1, Jan. 1, 1952 (Jan. 1, 1952), Seite 78, XP002072641 (English translation provided).

(Continued)

*Primary Examiner* — Mark A Osele
(74) *Attorney, Agent, or Firm* — Matthew B. Dernier Esq.

(57) ABSTRACT

The present invention relates to a method for producing a bag in the interior space of a container and for testing said bag, and to a system for this purpose, to a computer program product for execution, and to the use of the system for the methods.

21 Claims, 9 Drawing Sheets

(51) Int. Cl.
  *B32B 43/00* (2006.01)
  *B29C 49/42* (2006.01)
  *B65D 1/02* (2006.01)
  *B65D 23/02* (2006.01)
  *B29C 49/00* (2006.01)
  *B29C 48/00* (2019.01)
  *G01M 99/00* (2011.01)
  *B29L 31/00* (2006.01)
  *B29C 49/04* (2006.01)
  *B29L 9/00* (2006.01)
  *B29C 49/22* (2006.01)

(52) U.S. Cl.
  CPC .......... *B29C 49/4273* (2013.01); *B29C 49/80* (2013.01); *B65D 1/0215* (2013.01); *B65D 23/02* (2013.01); *G01M 3/3218* (2013.01); *G01M 3/3236* (2013.01); *G01M 3/3281* (2013.01); *G01M 99/00* (2013.01); *B29C 49/04* (2013.01); *B29C 49/22* (2013.01); *B29C 2949/78025* (2013.01); *B29L 2009/001* (2013.01); *B29L 2031/7128* (2013.01); *B65D 2205/00* (2013.01)

(58) Field of Classification Search
  CPC .................. G01M 3/3281; B29C 49/80; Y10T 156/1126; Y10T 156/1132; Y10T 156/1142; Y10T 156/1928; Y10T 156/1944
  See application file for complete search history.

(56) References Cited

U.S. PATENT DOCUMENTS

| | | | |
|---|---|---|---|
| 5,333,492 A * | 8/1994 | Aarts | G01M 3/3218 73/49.3 |
| 6,205,847 B1 | 3/2001 | Nomoto | |
| 6,503,440 B2 | 1/2003 | Kuehn | |
| 7,585,452 B2 | 9/2009 | Kneer | |
| 2002/0001687 A1 | 1/2002 | Safian | |
| 2004/0112921 A1 | 6/2004 | Nomoto | |
| 2009/0039549 A1 | 2/2009 | Kneer | |
| 2009/0274788 A1 * | 11/2009 | Kneer | B29C 49/22 425/149 |
| 2020/0172312 A1 * | 6/2020 | Taruno | B65D 1/0215 |

FOREIGN PATENT DOCUMENTS

| | | |
|---|---|---|
| DE | 2927708 A1 | 3/1980 |
| DE | 8433745 U1 | 3/1985 |
| DE | 10240295 A1 | 4/2004 |
| DE | 102006012487 A1 | 12/2006 |
| EP | 0313678 A1 | 5/1989 |
| EP | 0967472 A1 | 12/1999 |
| EP | 2172400 A1 | 4/2010 |
| GB | 1472178 A | 5/1977 |
| GB | 2155117 A | 9/1985 |
| WO | 2001039957 A1 | 6/2001 |
| WO | 2001076849 A1 | 10/2001 |

OTHER PUBLICATIONS

International Search Report for corresponding PCT Application No. PCT/EP2017/025267, 7 pages, dated Dec. 12, 2017.

* cited by examiner

METHOD FOR FORMING AND/OR TESTING A BAG IN THE INTERIOR SPACE OF A CONTAINER

CROSS REFERENCE TO RELATED APPLICATIONS

This is a national phase application of International Application No. PCT/EP2017/025267, filed Sep. 232, 2017, which claims priority to EP 16020352.7, filed Sep. 26, 2016, the entire disclosures of which are hereby incorporated by reference.

BACKGROUND

In principle, the present invention relates to containers comprising an internal bag.

Containers of the type in question are firstly known for separating contents and propellants, for example from DE 2 927 708 A1 relating to a container for forming a spray nozzle. In this case, the internal bag separates a medium located in the bag, such as a liquid, from a propellant, which surrounds the bag or is arranged between the bag and the inner face of a wall of the container. Secondly, containers comprising an internal bag without propellants are also known from the cosmetics dispensers sector, for example from DE 2 438 298 A1 or GB2155117 A1.

WO 01/76849 A1 discloses a container in which a bag is formed in the interior space of the container. The container comprises an opening for extracting a medium located in the bag, and also a ventilation opening, which allows ambient air to flow in and out on the side remote from the medium, between the container wall and bag. In this case, the bag is collapsible. Negative pressure generated when medium is extracted from the bag can be equalised or prevented by collapsing the bag in view of the air flowing towards the bag surroundings through the ventilation opening.

The inner bag is not peeled away beyond the bottom seam beforehand either. Additionally, the bag may detach in an unfavourable manner, meaning that a larger residual volume remains when the bag contents are extracted, for example if a mouth region of the inner bag is obstructed. In addition, there is no mention of speeding up or improving the container production or container testing. There is no mention of an advantageous design of a system either.

AU 2014 355 544 A1 relates to a container comprising an inner bag, wherein a gap is formed between an outer shell and the inner bag by a hole being made in the outer shell, said hole connecting the gap in the receiving portion to the exterior space.

The bag is peeled away beforehand by blowing air through the hole. However, this peeling process creates problems in particular when, for production reasons, the bag material is more strongly adherent, since in this case either the bag material is stretched and can become permeable or brittle, or the pre-peeling remains incomplete and the resultant incompletely collapsible bag prevents the product from being fully extracted from the bag subsequently. There is no mention of an advantageous design of a system either.

In addition, AU 2014 355 544 A1 relates to a tightness check by admitting noble gas and detecting the noble gas in order to determine the tightness. Since this method uses noble gas, however, it is expensive and requires complex noble gas recovery equipment. There is no mention of an advantageous design of a system either.

US 2004/0112921 A1 relates to a container comprising a synthetic-resin outer layer having an air suction hole, and a synthetic-resin inner layer provided on the inner face of the outer layer so as to be laminated separately. The inner layer comprises a portion that has been pre-separated beforehand from the outer layer around the air suction hole. The air suction hole can be produced by externally driving a punch into the outer layer at a neck of the container, thereby not only piercing the outer layer, but the inner layer too. The inner layer is intended to be peeled away when product is extracted; the pre-peeling in the neck region is intended for facilitating this. The pre-peeling process is only carried out in a small portion, and so contents can be extracted only when a considerable differential pressure sufficient to continue the peeling prevails.

In addition, the inner layer is provided remote from the air suction hole by an adhesive layer and can be provided linearly along a longitudinal axis, on a circumferential line or in a punctiform manner. However, producing an adhesive connection only in some portions is time-consuming and difficult in production terms and requires an adhesive that both glues together the materials, which can otherwise be easily detached from one another, and can be used in the production process; this is complex in production terms and requires the use of additional materials. There is no mention of an advantageous design of a system either.

DE 10 2006 012 487 A1 relates to a method for producing a container that contains a substantially rigid outer container and a slightly deformable inner bag consisting of thermoplastics that are not welded together, wherein the container has a container opening and the outer container has at least one wall opening through which pressure in the gap between the inner bag and the outer container is equalised when the inner bag contracts as a result of its contents being dispensed. The container opening is sealed and the at least one wall opening is formed, in a manner known per se, by a drill bit or lancing needle drilling through or piercing the wall of the outer container; once the wall of the outer container has been fully pierced, a pressure medium, preferably compressed air, is introduced into the gap between the container and the inner bag. A plurality of wall openings can accordingly be formed. Consequently, however, this method is very complex and requires the use of a plurality of drill bits, a system for repositioning drill bits or a combination thereof. In addition, a drawback results from the fact that the production of the drilled holes always poses the risk of damaging or at least weakening the inner bag. Accordingly, the inner bag is put under strain and tends to have defects. There is no mention of an advantageous design of a system either.

EP 0 313 678 A1 relates to a method and to an assembly for testing the sealing of at least one hollow member and/or for measuring a volume change caused by pressure being applied to the walls of said member, and to the use of the method and assembly for flexible hollow members, such as coffee packs. In this case, the closed hollow member is fully inserted into a chamber, the chamber is pressurised and any leakage when the pressure changes is detected. This method is sufficient and suitable for closed coffee capsules; however, it is imprecise since pressure changes can also be caused by deformation and the volume change is sufficient for detection only in the case of large leaks. Moreover, there is no mention of an advantageous design of a system that could be used to produce a container or test a container more accurately or more quickly.

WO 01/39957 relates to a method for producing containers consisting of a rigid, substantially dimensionally stable outer container and a slightly deformable inner container (dual-layer container), which is connected to the outer container in such a way that a medium located therein can be completely sucked away by applying a negative pressure. Permanently open mash seams are provided on the shoulders of the container. Consequently, air can flow into the gap between the outer container and inner container. This does not remove the need to overcome the adhesion of the inner container by means of a suitable pressure differential. It is also unclear how this can be done in a gentle manner or in such a way that the inner container is not located in front of the container opening when the contents are being extracted, thereby obstructing said opening and preventing the contents from being fully extracted. Furthermore, there is no mention of speeding up or improving the container production or container testing. There is no mention of an advantageous design of a system either.

DE 84 33 745.1 U1 relates to a container comprising a bag-like inner container. The use of an immersion tube is intended to ensure the container is emptied as completely as possible. In the neck region, the inner container can be anchored, whilst a container opening is formed in the bottom region. This does not prevent the immersion tube randomly becoming obstructed. Moreover, there is no mention here of speeding up or improving the container production or container testing. There is no mention of an advantageous design of a system either.

EP 2 172 400 A1 relates to a blow moulding process for producing a container comprising an inner container, wherein the container is opened in the bottom seam region. This does not prevent the immersion tube randomly becoming obstructed. In addition, there is no mention of speeding up or improving the container production or container testing. There is no mention of an advantageous design of a system either.

US 2002/001687 A1 relates to a container comprising a bag-like inner container. In this case, a seam region at the bottom is used to form a ventilation opening. But here too, there is no mention of speeding up or improving the container production or container testing. There is no mention of an advantageous design of a system either.

SUMMARY OF THE INVENTION

The problem addressed by the present invention is that of providing a method, an associated computer program product, a system and the use thereof, by which a container comprising an internal bag can be produced. Moreover, the problem addressed by the present invention is that of providing a container comprising an internal bag, wherein the functioning of the container and/or the reliability of the collapsibility or pressure equalisation is improved.

Particularly preferably, the present invention relates to containers comprising an internal bag, in which, by peeling away bag material from an inner face of a wall of the container, a bag located in said container is formed or the collapsibility of the bag is ensured. In this respect, the container comprises an extraction opening for extracting a medium located in or fillable into the bag, and a ventilation opening, through which ambient air can reach the outside of the bag for the purpose of pressure equalisation.

The interior space of the container or the volume formed by a wall that gives the container its shape comprises an extraction side associated with the extraction opening and a ventilation side associated with the ventilation opening, which sides are separated from one another by the bag material. In particular, the bag or bag material (the material forming the bag) forms a barrier between different portions of the interior space of the container, thereby separating, in particular in a fluid-tight and/or preferably an air-tight manner, the bag interior space, which is in fluid communication with the extraction opening, from the ventilation opening, which is in communication with the outside of the bag.

The extraction side preferably corresponds to or is associated with the inner face of the bag. In other words, the extraction side corresponds to or is in fluid communication with the space enclosed by the bag or by the material forming the bag.

The ventilation side preferably corresponds to or is associated with the outside of the bag. In other words, the ventilation side corresponds to or is in fluid communication with the space formed between the inner face of the outer container and the bag or the material forming the bag.

According to a first aspect of the present invention, to form the bag or peel it away in the interior space of the container, the bag material, which is stuck to the inner face of the wall of the container when in an initial state, is peeled away by a differential pressure being generated between the ventilation side and the extraction side or by a lower pressure being generated on the extraction side than on the ventilation side, the bag being formed and/or the collapsibility of the bag being ensured by the detachment of the bag material of the bag. In this case, the bag is preferably peeled away from the inner face of the wall of the container in stages by alternately changing the differential pressure between the ventilation side and the extraction side.

The container preferably comprises a substantially rigid or dimensionally stable outer container formed by the wall of the container.

The container is preferably produced by an extrusion blowing method, in which a tube is initially formed from the material forming the wall (in particular following suitable heating). This tube can then be made into the shape of the container. To do so, gas, in particular air, is preferably conducted through a tube opening such that the tube material is pressed or blown against the mould from the inside (moulding step in the production process).

Particularly preferably, during production of the container, the bag material is coextruded together with the material forming the wall of the container. In the process, two coaxial tubes directly abutting one another are simultaneously formed or a dual-layer tube is formed. The two tubes or two layers preferably consist of different materials. The outer tube or outer layer of the tube forms what will become the wall (outside) and the inner tube or inner layer forms what will become the bag (inside) of the container. In the process, the bag material preferably remains separable from the material forming the wall of the container, for example by using plastics materials that do not coalesce with one another in a permanent, inseparable manner, preferably by using different thermoplastics and/or by using a separator.

The container is produced, preferably by means of a blowing process, from coaxial, directly abutting tubes that are produced either by means of the aforementioned coextrusion or otherwise and constitute materials forming the wall (outside) and the bag (inside). The bag material then remains stuck to the inner face of the wall of the container.

The aspects of the present invention are particularly advantageous in containers produced in the above-described manner, but can also be applied to containers produced otherwise in which a bag material preferably initially sticks to the inner face of the container, in particular due to their production.

The bag material sticking to the wall of the container in this manner impairs the collapsibility of the bag: If the bag or the volume enclosed by the bag material is now filled with a product and the product is then extracted, a vacuum is formed in the container. Only once the vacuum is sufficiently large as to equalise or exceed the counter-pressure generated by the adhesion force does the bag material peel away from the wall of the container, thereby forming the bag, and the pressure can be equalised by collapsing or reducing the internal volume of the bag. Since a vacuum in the bag has an adverse impact on the extraction of product from the bag, it has proven advantageous to already detach the bag material from the wall before the container or bag is filled and to thus ensure the collapsibility of the bag even when the product is extracted for the first time. In this respect, it has been found to be particularly advantageous to use the proposed alternating differential pressure, since this detaches the bag material in stages in a gentle manner. This can therefore prevent damage to the bag caused by the peeling process.

Another aspect of the present invention, which can also be implemented independently, relates to a method for determining a volume by which the bag can be collapsed, a degree to which the bag has peeled away from the inner wall of the container and/or a corresponding parameter.

Strictly speaking, the degree of peeling should be understood to mean a quotient in which the proportion of the wall surface area away from which the bag has peeled is compared with the proportion of the entire inner wall surface area. However, it is almost impossible to directly determine the degree of peeling, and so wherever the determination of the degree of peeling is mentioned herein, one or more parameters correlating with the degree of peeling are checked. In this respect, the fact that the ability of the bag to change volume or collapse is dependent on the degree of peeling is preferably utilised: If there is a pressure differential in which the ventilation-side pressure is greater than the extraction-side pressure, the bag can only collapse where it is not stuck to the wall.

Particularly preferably, the degree of peeling, the volume and/or the parameter is determined on the basis of pressure measurements. In this case, a pressure storage volume is provided in particular, implemented for example by a pressure storage container or pressure equalisation container. Said container is brought to a target pressure and then connected to the ventilation side such that the pressure between the pressure storage volume and the ventilation side is equalised. The resultant pressure in the pressure storage volume or ventilation side of the bag following the pressure equalisation is measured as a parameter or to determine the degree of peeling.

Preferably, the target pressure exceeds the pressure on the extraction side, and so the bag is displaced by the pressure equalisation. The more the bag is displaced towards the extraction side (i.e. the more it collapses), the lower the pressure measured on the ventilation side.

It has proven advantageous if the bag only sticks to the wall of the container to such a low extent that the bag is at least substantially fully collapsible, without the collapsing of the bag requiring the bag material to peel any further away from the wall of the container. In this case, the build-up of any counter-pressure when extracting a product from the bag can be at least substantially entirely prevented.

In this respect, it is not strictly necessary for the bag material to be fully detached from the wall of the container since sufficient and/or complete collapsing is possible even when the bag material is still stuck in part. In this context, complete collapsing of the bag is understood to in particular mean the smallest possible or tightest possible folding together of the bag, although the foldability is limited by the material properties of the bag. Preferably, the bag is fully collapsible such that the ventilation side at least substantially or almost entirely fills the interior space formed by the wall of the container (minus the volume taken up by the bag material itself, and minus the volume still enclosed between the folds of the bag material even when the bag is fully collapsed, caused by the smallest possible radii of bend of the bag material).

The bag peeled away from the wall of the container at least in part can preferably collapse to the extent that the interior space of the container, besides the volume then largely occupied by the ventilation side, preferably comprises just a few percent dead volume on the extraction side, for example less than 10%, preferably less than 5% or 3%, of the total volume of the container, only the volume occupied by the bag material and optionally by extraction devices. Preferably this dead volume is formed substantially only by the volume still enclosed between the folds of the bag material even when the bag is fully collapsed, caused by the smallest possible radii of bend of the bag material. To determine or verify a corresponding degree of peeling, the above-described method has proven particularly reliable, accurate and quick.

By means of the proposed differential pressure method, it is possible to form the inner bag or peel it away from the wall of the container in a gentle manner. In general, defects such as tears or leakages, which lead to leaks between the extraction side and the ventilation side, cannot be entirely ruled out when producing the container. It has proven advantageous to identify such leaks as early as possible in order to prevent rejects in containers that have already been filled.

Advantageously, it is possible to combine the first aspect of the present invention for forming or peeling away the bag with the second aspect relating to the determination of a volume by which the bag can be collapsed, a degree to which the bag has peeled away from the inner wall of the container and/or a corresponding parameter. In doing so, the method according to the second aspect preferably comes after the method according to the first aspect. Preferably, therefore, the bag material is peeled away or the bag formed first, and the volume by which the bag can collapse, the degree of peeling or the corresponding parameter is determined thereafter.

It can be provided that a first, preferably rough determination of the degree of peeling and/or of the tightness of the bag is carried out as early as during the peeling of the bag material. For this purpose, a characteristic, in particular a change, in particular over time, of the pressure at or the differential pressure between the ventilation side and/or the extraction side can be identified and interpreted. For example, a gross leakage in the bag may lead to the differential pressure desired for a peeling process not being reached due to pressure being equalised through the bag or past the bag material. If a gross leakage or gross leak is identified in this manner, the container can be rejected or further method steps can be discarded.

According to another aspect of the present invention, which can also be implemented independently, the degree of tightness of the bag is determined. In this case, overpressure is first applied to the extraction side compared with the ventilation side, and so the bag is joined to the wall of the container. In addition, a closed test volume is generated on or by the ventilation side. In this test volume, a pressure or a pressure differential is determined following or depending on a test duration and this pressure or pressure differential is used as an indicator for the degree of tightness of the bag.

In this case, it is particularly preferable for the test volume to initially be under a vacuum or negative pressure compared with a pressure on the extraction side and/or compared with ambient pressure or normal pressure. This vacuum or negative pressure can be generated by extracting, in particular pumping out, air from the test volume. When the test volume is in this state, a first pressure measurement is taken. During or after the test duration, at least a second pressure measurement is then taken in order to determine the pressure or the differential pressure.

Within the meaning of the present invention, even an absolute pressure of less than 70 kPa, preferably less than 60 kPa, in particular less than 50 kPa, is preferably referred to as a "vacuum". The vacuum can in particular be a low vacuum (absolute pressure of 0.1 to 30 kPa).

Preferably, "negative pressure" should be understood to mean a pressure below ambient pressure (normal pressure or 101.3 kPa) or below the pressure of another reference volume, preferably by more than 30 kPa, in particular by more than 40 kPa. The negative pressure can be an absolute pressure that verges on the pressure range of a low vacuum or is at most 40 kPa, 30 kPa or 20 kPa above the negative pressure of 30 kPa referred to as the maximum for a low vacuum.

Specifically in the case of the tightness test, a vacuum or negative pressure that initially or in the first measurement preferably corresponds to a pressure of at least 30 kPa below ambient pressure (normal pressure or 101.3 kPa), preferably more than 40 kPa or 50 kPa and/or less than 80 kPa, in particular less than 70 kPa below ambient pressure (normal pressure or 101.3 kPa), is preferably generated in the test volume. Accordingly, the absolute pressure in the test volume is preferably less than 70 kPa, preferably less than 60 kPa, in particular less than 50 kPa and/or more than 20 kPa, in particular more than 30 kPa.

Throughout the test period, the extraction side can have an at least substantially constant or variable overpressure in relation to the ventilation side. It is possible for the extraction side to be ventilated, i.e. to be connected to the surroundings, such that ambient air can enter and exit. In this case, the number value of the pressure differential between the ventilation side and the extraction side matches that of the negative pressure on the ventilation side. Particularly preferred, however, is an overpressure on the ventilation side in relation to the surroundings, of for example 150 kPa to 250 kPa above ambient pressure, and/or in relation to the ventilation side, of for example 200 kPa to 300 kPa.

The above-described method for tightness testing is advantageous in that, by joining the bag to the wall of the container, the flexibility or elasticity of the bag does not influence the measurement result, and consequently a pressure increase on the vented or evacuated ventilation side correlates with a tightness to a high degree of reliability and can thus be used effectively as an indicator for the degree of tightness. In addition, the wall of the container protects the bag material from being overstretched by internally applied overpressure.

Furthermore, measuring the negative pressure on the ventilation side is advantageous in that low pressure differentials can be determined very accurately in a relatively simple manner. This makes it possible to determine the degree of tightness reliably while also in a relatively simple manner.

Advantageously, testing the tightness of the bag can be combined with the above-described aspects. In this respect, a test for gross leaks can be carried out during the peeling process and/or during the determination of the degree of peeling, and the tightness of the bag is tested only when no gross leaks have been detected. Alternatively or additionally, the tightness test is carried out only when a sufficient degree of peeling has been determined, the bag is sufficiently collapsible or the corresponding parameter is within a predefined range or tolerance range, i.e. the container has not already been rejected in the previous aspects.

According to another aspect of the present invention, which can also be implemented independently, the container comprises a non-circular, preferably elongate, in particular slot-like ventilation opening. Preferably, a radial pressure is exerted on the container during or as a result of insertion into a (test) chamber of a system and acts on the ventilation opening or in the direction of a longitudinal axis of the non-circular ventilation opening such that the, in particular hydraulic, diameter and/or opening cross-sectional area thereof is enlarged.

In principle, small hydraulic diameters or opening cross sections are preferred for a ventilation opening since this reduces gas exchange and potentially the escape of substances that may diffuse through the bag material. However, for the methods according to the present invention, it is preferable to temporarily enlarge the hydraulic diameter or opening cross-sectional area since this can achieve reduced flow resistance and thus save time and increase accuracy.

To be able to enlarge the (hydraulic) diameter or opening cross-sectional area for only a certain amount of time or reversibly, the ventilation opening is elongate; this leads to a reversible, temporary spreading or inversion when a radial or lateral pressure is applied to the container, thereby widening the (hydraulic) diameter or opening cross-sectional area. In particular, a pressure is produced on the container at least in a direction along a slot-like ventilation opening or in the direction of the longitudinal extension of the ventilation opening. As a result, the container is compressed in the region of the ventilation opening, leading to the preferably slot-like ventilation opening being pushed apart.

Another aspect of the present invention, which can also be implemented independently, relates to a system that is preferably designed to carry out one or more of the methods of the present invention. The system comprises a (test) chamber, into which the container can be or is inserted such that the test chamber tightly secures the extraction side and the ventilation side separately from one another. In particular, the test chamber comprises at least two accesses and sealing means in order to allow access to both the extraction side and ventilation side while sealing them with respect to one another.

According to an aspect of the present invention, which can also be implemented independently, the system is designed to produce a differential pressure between the extraction side and ventilation side to peel the bag away from the inner wall of the container. In this way, a bag material stuck to the wall can be peeled away and thus a bag can be formed, which preferably can then be collapsed without a differential pressure being applied in particular permanently and/or constantly. In particular, the system is designed to carry out the method according to the first aspect of the present invention.

According to another aspect of the present invention, which can also be implemented independently, the system comprises a pressure storage volume, in particular a pressure equalisation container, and is designed to bring the pressure storage volume to a (predefinable) pressure that is different from the pressure of the ventilation side. In addition, the system preferably comprises a valve connecting the pressure storage volume to the ventilation side by means of the test chamber, such that the pressure between the pressure storage volume and the ventilation side can be equalised. This valve or another valve can be used to separate the pressure storage volume, in particular to disconnect it from a pressure source, before the pressure equalisation. The system preferably also comprises a pressure sensor that is designed to determine a pressure change during or after the establishment of the connection between the ventilation side and the pressure storage volume. For this purpose, the pressure sensor can be provided on or secured to the pressure storage volume, the ventilation-side test chamber or therebetween. As a result, a sufficient degree of peeling can be rapidly and reliably verified. It is also possible to detect a gross leak if the pressure sensor identifies a pressure drop that exceeds a limit value.

In particular, the system is designed to carry out the method according to the second aspect of the present invention. In the process, the system may also be designed to carry out both the first and second aspect of the present invention, in particular in this order.

According to another aspect of the present invention, which can also be implemented independently, the system is designed to determine the degree of tightness or test the tightness of bags provided in containers or to test for leaks therein, in which case a differential pressure can be built up between the extraction side and the ventilation side and the system comprises a pressure sensor and an analysis device connected to the pressure sensor. In this case, the analysis device is designed to measure a change in the differential pressure and to compare this change with a threshold value.

Preferably, the system can detect tightness, leakages, leaks or the degree thereof when or as a result of the value reaching, exceeding or dropping below the threshold value, and can preferably possibly initiate the discarding of the container.

In particular, in order to determine the degree of tightness or test the tightness or test for leaks, the system is designed to generate a negative pressure on the extraction side and to generate a negative pressure on the ventilation side compared with the extraction side and/or the surroundings. Furthermore, the system is preferably designed to generate a negative pressure on the extraction side with respect to the ventilation side and/or the surroundings. In this way, a differential pressure can be generated using the system. Next, preferably after or over a time period, a pressure change on the ventilation side is identified by the system and, on this basis, the tightness is tested or the degree of tightness determined.

In particular, the system is designed to carry out the method according to the third aspect of the present invention. Moreover, the system can be designed to carry out the method according to the second aspect and the third aspect, particularly preferably according to the first, second and third aspect of the present invention, in particular in that order. On one hand, corresponding advantages are thus achieved. On the other hand, time can be saved and the complexity of the system reduced by combining different steps in the same system. Alternatively, however, it is also possible for different methods or method steps to be carried out in different systems or chambers. For this purpose, the system can also have two or more chambers.

In principle, the same pressure sensor is used for the pressure measurement as already used for determining the degree of peeling. The pressure sensor can thus be connected to the ventilation side.

It is also preferable for the system to have a vacuum pump for evacuating or reducing the pressure on the ventilation side. Alternatively or additionally, the system comprises a pressure pump, a compressed air source or another device for generating an overpressure on the extraction side.

In the event of a pressure differential generated by an overpressure applied to the extraction side, the bag is joined to the container wall. Consequently, it can be ensured that any subsequently detected change in the (negative) pressure on the ventilation side is correlated with the bag being permeable. It is therefore ensured in particular that the result, i.e. the subsequently detected change in the (negative) pressure, is not influenced by volume fluctuations or by additional inflation of the bag. Moreover, it has proven particularly quick and accurate to observe the (negative) pressure on the ventilation side since this can reliably detect even small pressure increases and can be used to detect a leak. A (low) vacuum or negative pressure has proven particularly advantageous for precise determination since pressure fluctuations occurring in this case can be determined very accurately and thus even minor leaks in the bag can be reliably detected.

In another aspect of the present invention, which can also be implemented independently, the system comprises a (test) chamber for or together with the container, the chamber being designed, in particular by means of a tapering diameter, to produce a radial pressure on the wall of the container by the container being inserted into the chamber or during or following said insertion, such that the hydraulic cross section of the ventilation opening can be enlarged. By means of the enlarged diameter or opening cross-sectional area, a pressure equalisation through the ventilation opening can be sped up. Consequently, the peeling of the bag material can be improved or sped up and/or measurements on the ventilation side can be sped up or their accuracy improved.

Another aspect of the invention, which can also be implemented independently, relates to a container that comprises an internal bag and can be produced or tested according to a method in accordance with the present invention, the bag sticking to an inner wall of the container in a portion in an extension direction between the container base and the preferably opposite extraction opening.

As described above, it is advantageous to peel the bag material away from the wall before the product is filled in so as to prevent the generation of a counter-pressure (caused by the bag sticking to the wall) during the extraction of the product. However, it has also been found to be advantageous for the bag material to remain stuck to the inner wall of the container to a certain degree, specifically in the main extension direction, since this allows for a specific collapsing direction of the bag and thus the ability to extract at least substantially all of the product.

Advantageously, since the bag is stuck along the inner wall of the container, when the bag collapses, it can fold at least substantially laterally over the surface of a suction element, such as a spike or an immersion tube, without obstructing the suction opening on the end thereof. This enables a lower residual volume and/or improved reliability.

Another aspect of the present invention, which can also be implemented independently, relates to a computer program product comprising program code means which, when executed, carry out a method according to the present invention the method, in particular using the proposed system. The computer program product can be a computer-readable storage medium and/or a control device that, by means of pressure regulation and/or valve control, causes the bag material to peel away in stages, allows a degree of bag peeling to be identified by means of a pressure sensor, and allows the pressure sensor data to be analysed and/or the tightness to be verified by analysing a pressure sensor data time curve.

Another aspect of the present invention, which can also be implemented independently, relates to the use of a proposed system for producing a bag in a container by peeling away the bag material and/or for testing the container using any of the proposed methods.

BRIEF DESCRIPTION OF THE DRAWING

Other aspects and advantages of the present invention will become apparent from the claims and the following description of a preferred embodiment with reference to the drawings, in which:

DETAILED DESCRIPTION

In the figures, the same reference signs are used for the same or similar parts; similar parts may correspond to one another and/or similar properties and advantages may be achieved even if the description thereof is not repeated.

Figure 1:
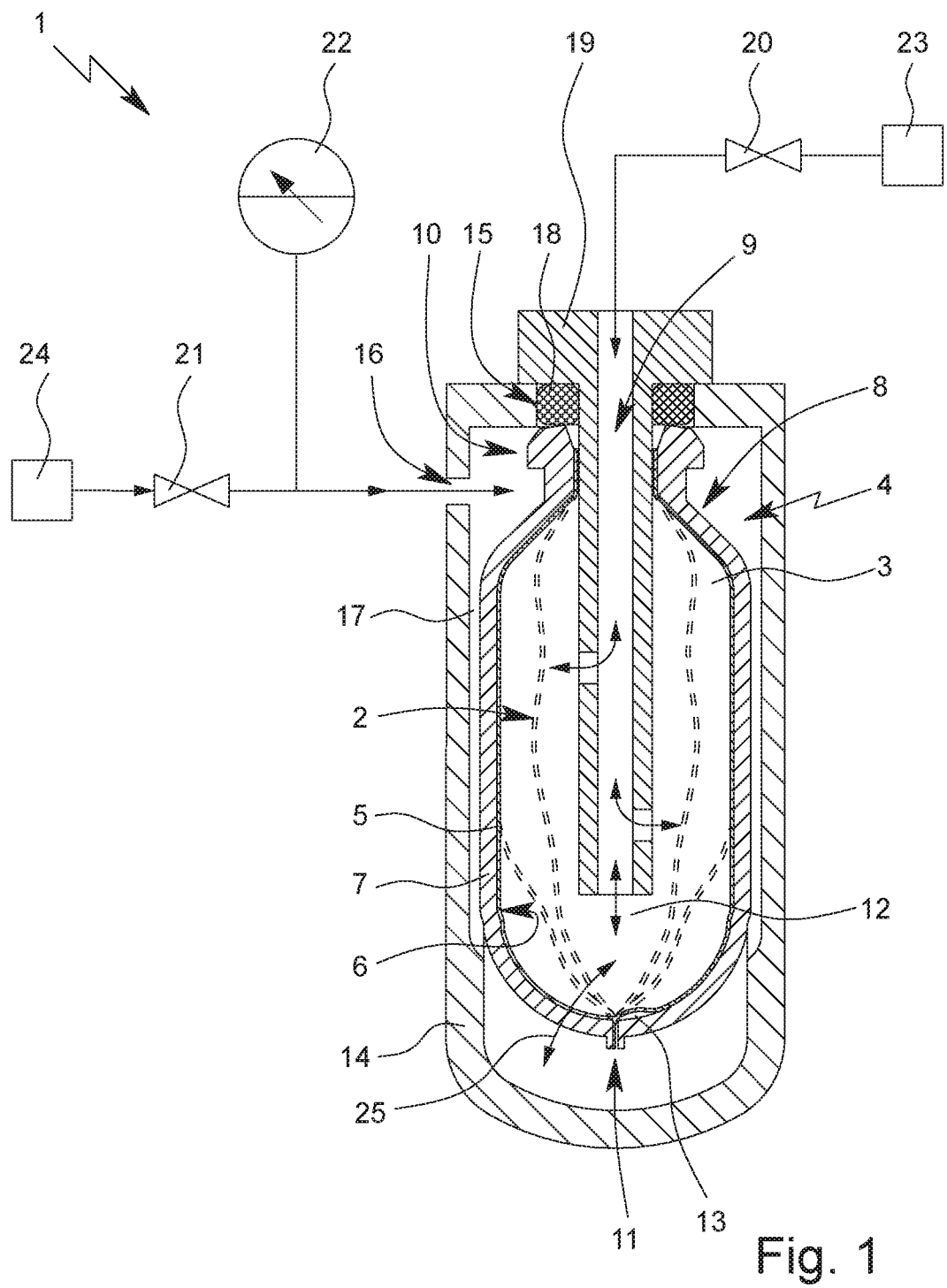
FIG. 1 is a schematic cross section through a proposed system for peeling away the bag material.

FIG. 1 is the schematic cross section through a system 1 for forming a bag 2 in the interior space 3 of a container 4 or for ensuring the functionality of the collapsibility of the bag 2 in the interior space of the container 4.

The container 4 preferably comprises an outer container 8 comprising or being formed by the wall 7. The outer container 8 and/or the wall 7 is/are preferably at least substantially dimensionally stable or rigid, but can preferably be resiliently and/or reversibly deformed by a force. The outer container 8 gives the container 4 its shape and defines the openings therein.

In particular, the bag material 5 initially sticks to the inner face 6 of the wall 7 of the container 4.

Preferably, the bag material 5 at least substantially lines the interior of the outer container 8 or wall 7. This can be achieved in particular by the container 4 being produced having abutting layers of bag material 5 and material of the wall 7. For this purpose, the bag material 5 and the wall 7 are in particular first moulded, in particular coextruded, to form two coaxial tubes, after which the container 4 is given its shape, preferably by means of a blowing process.

The bag material 5 and the wall 7 preferably do not coalesce with one another in a permanent, inseparable connection, or one that can only be separated by destruction, and in particular do not form a chemical bond. Instead, they abut one another and/or stick to one another directly, preferably in a releasable or separable manner or adhesively (in particular without being destroyed).

Preferable in the present case are material pairs that adhesively stick to one another in such a manner that they can be separated without being destroyed despite being in direct contact. This can be achieved by the material pair of the bag material 5 and the material forming the wall 7 being selected such that these materials either do not form a mixture during extrusion or separate upon cooling. Preferably, the bag material 5 and the material forming the wall 7 are different thermoplastics, in particular different polyolefins, such as the material pair PE/PP. Preferably, the melting points of the materials differ, preferably by more than 30° C., in particular by more than 40° C. or 50° C. Preferably, the materials exhibit slight entropy of mixing, preferably such that they separate, for example at less than 100° C. Alternatively or additionally, the intrinsic adhesion of each material can be greater than the adhesion to one another. The peel force of the directly adjoining materials is preferably less than 8 N/100 mm, in particular less than 5 N/100 mm.

One important criterion for the selection of a suitable material pair is that the Huggins interaction parameter $\chi$ of the material pair (in the molten mass) is less than the critical Huggins interaction parameter $\chi_C$, preferably by at least a factor of 2, 5 or 10. In this case, the Huggins interaction parameter $\chi$ describes the adhesion behaviour of abutting polymers on the basis of the Flory-Huggins solution theory.

Alternatively or additionally, however, separators can also be used during extrusion between the bag material 5 and the material forming the wall 7, or other measures can be taken to allow the bag material 5 to be subsequently peeled away from the wall 7.

The container 4 preferably comprises an extraction opening 9 for extracting a product that can be arranged within the bag 2. In particular, the extraction opening 9 is formed by a neck region 10 of the container 4. The neck region 10 can have a collar for fitting a seal or adapter, in particular by means of a crimped connection or press fit. The extraction opening 9 enables access to the interior of the bag 2 or of the volume enclosed by the bag material 5. In the region of the extraction opening, the bag material 5 abuts the wall 7 in a preferably permanently sealed manner. This can be achieved by crimping or pressing.

The container 4 preferably also comprises a ventilation opening 11. In the example shown, this is provided in the outer container 8 or the wall thereof 7 on a side of the container 4 remote from or opposite the extraction opening 9, but in principle can also be provided at another point. The ventilation opening 11 enables access to the interior space 3 of the container 4 on the outside of the bag 2 or the side thereof remote from the extraction side 12.

Preferably, the production of the ventilation opening 11 is a step in the production process of the container 4, this step in particular taking place after the moulding step in the production process and before a step for (at least partly) peeling the bag material 5 away from the wall 7. Preferably, the container 4 is moulded from the coaxially arranged and/or coextruded tubes nested within one another, by means of a preferably two-part mould or blow mould. Particularly preferably, parts of the mould or blow mould are closed over the tubes such that the tubes are crimped together at least at one point. This preferably forms an outwardly protruding seam or bottom seam such that the internal bag material 5 is welded together or a bag seal is formed at this point from the internal tube. In this way, from the initially tubular bag material 5, it is possible to form a volume that is only open at the extraction opening 9 and is enclosed by the bag material 5. Preferably, the ventilation opening 11 is formed in the region of the seam or bottom seam.

Preferably, the ventilation opening 11 is formed by the bottom seam being cut off at least in part, but preferably not fully, after the shaping, in such a way that at least a portion of the seam of the bag 2 remains fixed in place in the seam of the wall 7 of the container 4. Next, a radial force acting in the seam direction is introduced in the bottom region, breaking the bottom seam. In this case, it is preferable for the temperature of the moulding produced by means of the blow mould to be between 40° and 70° when cutting off the bottom seam, and for the outer container to still be plastically deformable to a certain extent, such that the deformation caused by the force is a permanent deformation and is not completely undone by resilient recovery. The result is a broken bottom seam in which the ventilation opening 11 is formed between the bag material 5 and the wall 7, as shown by way of example in FIG. 9.

At the ventilation opening 11, the wall 7 is preferably detachable or detached from the bag material 5 and they are not interconnected, meaning that ambient air can enter between the bag material 5 and the wall 7. This allows for pressure equalisation while peeling the bag material 5 away from the inner face 6 of the wall 7. For details regarding the production of the ventilation opening 11, reference is made to the teaching of WO 01/76849.

The interior space of the container 4 preferably comprises an extraction side 12 associated with the extraction opening 9 and a ventilation side 13 associated with the ventilation opening 11, which sides are separated from one another by the bag material 5. The extraction side 12 is thus preferably within the bag or is the inner face of the bag 2 or of the volume formed by the bag material 5 or is connected thereto, whereas the ventilation side 13 is provided outside the bag 2 or bag material 5 or provided between the bag material 5 and the wall 7.

In the example shown according to FIG. 1, the container 4 is arranged in a chamber 14. The chamber 14 comprises an extraction opening connector 15, by means of which the inner face of the bag 2 or of the volume formed by the bag material 5 can be connected. In this way, compressed air, for example, can be introduced or the interior space of the bag 2 or of the volume formed by the bag material 5 can be evacuated or the like. In particular, therefore, the connector is a fluid connector. The extraction opening connector 15 preferably forms a part of the extraction side 12, is associated therewith or allows for a connection thereto.

Furthermore, the chamber 15 preferably comprises a ventilation opening connector 16, which is preferably in communication, in particular fluid communication, with the ventilation opening 11. In this example shown, this is done by means of a wall perforation in combination with connection channels 17 guided laterally along the container 4. However, the ventilation opening connector 16 can also be in fluid communication with the ventilation opening 11 in another manner. The ventilation opening connector 16 is preferably connected to or forms part of the ventilation side 13.

By means of the extraction opening connector 15, overpressure or negative pressure can be applied to the inner face of the bag 2 or of the volume formed by the bag material 5. Overpressure or negative pressure can be applied to the ventilation side by means of the ventilation opening connector 16. In other words, the extraction opening connector 15 allows for a connection to the extraction side 12 and the ventilation opening connector 16 allows for a connection to the ventilation side 13, preferably in order to generate pressure differentials between the extraction side 12 and the ventilation side 13.

Together with the container 4, the chamber 14 is preferably designed to form two fluidically separate regions, namely an extraction-side fluid region that is in fluid communication with the extraction side 12, and a ventilation-side fluid region that is in fluid communication with the ventilation side 13. These regions preferably form pressure regions or pressure circuits separated from one another by the bag 2 or bag material 5. The system 1 preferably comprises means for applying a predefined or predefinable pressure to the regions and/or for connecting to the surroundings for the purpose of pressure equalisation. This can be implemented by pumps, valves and/or pressure stores.

The container 4 is preferably inserted in the chamber 14 in a manner sealed such that, when the bag 2 is formed correctly, the extraction side 12 is fluidically separate from the ventilation side 13 or the extraction opening connector 15 is fluidically separate from the ventilation opening connector 16, in particular in an air-tight or gas-tight manner. For this purpose, a seal 18 can be provided that seals the extraction-side fluid region with respect to the ventilation-side fluid region, in particular in an air-tight or gas-tight manner. In the example shown, a seal 18 of this kind seals, for example, the neck region 10 of the container 4 at the end face or seals the container 4 at the edge of the extraction opening 9 with respect to a housing of the chamber 14.

In addition, the system 1 preferably comprises an immersion tube-like spike 19 that penetrates the bag 2 or the volume formed by the bag material 5 (on the extraction side). The spike comprises end and/or side openings for introducing or removing substances, in particular gas or compressed air.

In the example shown from FIG. 1, the system 1 also comprises an extraction-side valve 20, by which an inflow into the bag 2 or an outflow of the bag 2 can be released and/or prevented. The ventilation interior space and the extraction side 12 can thus be ventilated and/or brought to a pressure and/or closed (in an air-tight manner).

Furthermore, the system 1 preferably comprises a ventilation-side valve 21, by which an inflow or outflow on the ventilation side 13 can be enabled or prevented. As a result, the outside of the bag 2 or the ventilation side 13 can be ventilated and/or brought to a pressure and/or closed (in an air-tight manner).

A pressure sensor 22 is preferably connected to the ventilation side 13. The pressure sensor 22 is preferably designed and configured to measure a ventilation-side pressure, in particular air pressure or gas pressure. In the example shown, the pressure sensor 22 is in direct fluid communication with the ventilation side 13. However, other solutions are also possible.

The present invention relates in particular to peeling the bag material 5 away from the inner face 6 of the wall 7 of the container 4 in order to form the bag 2.

A bag 2 within the meaning of the present invention is preferably a flexible, particularly preferably collapsible structure.

The bag 2 is preferably made of bag material 5. The bag material 5 is preferably film-like.

When in an initial state, the bag material 5 is held on the inner face 6 of the wall 7, in particular by adhesion. Therefore, the bag generally only becomes a bag 2 when the bag material 5 is peeled away from the inner face 6 of the wall 7 such that it can be freely detached from the wall 7. This is the case as soon as the bag material 5 has been detached from the inner face 6 of the wall 7 for the first time since this removes the adhesion between the wall 7 and the bag material 5.

The system 1 preferably comprises a pressure device 23 that can be connected to the extraction side 12 and/or a pressure device 24 that can be connected to the ventilation side 13. The pressure devices 23, 24 can be designed to change, in particular increase or lower, a pressure. In particular, this pressure is an air pressure or gas pressure. The pressure devices 23, 24 can thus be or comprise compressed air sources, for example. Alternatively or additionally, the pressure devices 23, 24 can be or comprise vacuum pumps. In this way, the pressure devices 23, 24 allow pressure differentials to be generated and/or changed between the extraction side 12 and the ventilation side 13.

According to an aspect of the present invention, a differential pressure 25 is generated between the ventilation side 13 and the extraction side 12 and changed in an alternating manner such that the bag material 5 stuck to the inner face 6 of the wall 7 of the container 4 or outer container 8 detaches in stages, thereby forming the bag 2. In particular, as the differential pressure 25 changes in an alternating manner, (a) overpressure and normal pressure or (b) overpressure and negative pressure or (c) negative pressure and normal pressure are set alternately at the extraction side. Preferably, a cycle 28 is predefined for the set pressure, a plurality of cycles 28 in particular running one after the other in the peeling process.

In FIG. 1, in addition to the bag material 5 attached to the wall 7, in particular adhesively, partly peeled variants of the bag material 5 are shown in dashed lines; the variants represent different situations in the course of the peeling process or occur during the process after different numbers of cycles 28. In this case, the schematically shown variants of the shape of the bag material 5 to some extent denote different peeling stages in the peeling process, in particular following peeling processes or cycles 28 (in the drawing, the bag material 5 is pushed from the outside inwards during the peeling).

First, a differential pressure 25 is generated, upon which there is an overpressure on the ventilation side 13 with respect to the extraction side 12, as a result of which the bag material 2 is firstly detached from the wall 7 in part. Next, the differential pressure 25 is reversed in terms of sign or in terms of the direction of the differential pressure 25, whereby the already peeled bag material 5 is re-joined to the wall 7. This can form a first cycle 28 in full or in part.

In a subsequent step, a differential pressure 25 is generated again, upon which the pressure on the ventilation side 13 is greater than on the extraction side 12. As a result, the bag material 5 in the already peeled portion is first moved away from the wall 7 and subsequently detaches another portion of the bag material 5 from the wall 7. Optionally, the differential pressure 25 can again be reversed in terms of sign or in terms of the direction of the differential pressure 25. By means of the resulting overpressure on the extraction side 12 in relation to the ventilation side 13, the peeled-away bag material 5 can be re-joined to the wall 7. This can form a second cycle 28 in full or in part.

In said second or subsequent additional cycles 28, the differential pressure 25 and/or its curve is preferably identical or similar to that from the first cycle 28, at least substantially; alternatively, however, it may deviate therefrom at least in terms of the absolute differential pressure values and/or the time periods over which differential pressure is applied.

By means of a cyclic differential pressure application of this kind, the bag material 5 is detached from the inner face 6 of the wall 7 in stages in a gentle manner and then forms the flexible, collapsible bag 2 for holding a product.

The differential pressure 25 is preferably varied between zero or zero crossing before a reversal of the differential pressure 25, and a maximum differential pressure 25. The maximum differential pressure 25, in particular overpressure on the ventilation side 13 in relation to the extraction side 12, is preferably more than 100 kPa, in particular more than 150 kPa, and/or less than 400 kPa, in particular less than 300 kPa. As a result, efficient peeling while simultaneously handling the bag material 5 gently can be achieved.

In one example, to generate the differential pressure 25, a negative pressure or vacuum is generated on one side (in particular the extraction side 12) and an overpressure (in particular compared with a normal or ambient pressure and/or pressure on the extraction side 12) is generated on the other side (in particular the ventilation side 13). In addition, the pressure conditions for forming the cycle 28 can be alternated or reversed or inverted, preferably in terms of the sign of the differential pressure 25.

A vacuum or negative pressure within the meaning of the present invention preferably corresponds to a negative pressure in relation to ambient pressure of at least 30 kPa, preferably more than 40 kPa or 50 kPa and/or less than 80 kPa, in particular less than 70 kPa. The absolute pressure is thus then approximately 20 to 60 kPa. The overpressure on the other side is thus then, for example, 150 kPa to 250 kPa.

A peeling cycle (referred to as cycle 28 hereinafter) preferably has (exactly) one phase of a positive differential pressure and/or of (exactly) one negative differential pressure 25 between the extraction side 12 and the ventilation side 13; in the context of the present invention, there is a positive differential pressure when the pressure on the ventilation side 13 is greater than on the extraction side 12. Consequently, there is a negative differential pressure when the pressure on the ventilation side 13 is lower than on the extraction side 12. A negative differential pressure is suitable for pressing the bag 2 or bag material 5 against the wall 7 or towards the wall 7, whereas the positive differential pressure acts in the opposite direction on the bag material 5 or into the bag 2, such that the bag material 5 is peeled away from the wall 7 and/or the bag 2 is moved or pressured towards the centre of the container 4.

To enable gentle peeling and thus low numbers of rejects during production of containers 4, a peeling process consisting of at least two cycles 28, preferably at least three cycles 28 and/or less than ten cycles 28, preferably less than eight cycles 28, in particular less than six cycles 28, has proven advantageous. To achieve a sufficient degree of peeling using fewer cycles 28, excessively high differential pressures 25 are required, which increase the risk of damage to the container 4 or bag 2. When too many cycles 28 are used, the bag material 5 is adversely affected. The use of three to four cycles 28 has proven particularly advantageous.

Preferably, a plurality of identical or at least similar cycles 28 are provided. This has proven advantageous in particular since, at least for the maximum positive differential pressure, it is possible to identify an optimum value or optimum range at which the peeling can be carried out as quickly as possible and yet still gently at the same time (in particular depending on the material pair of the material forming the wall 7 and the bag material 5). Therefore, appropriate differential pressure maximums and/or curves are used in the same or a similar manner in the different cycles 28. The same can also apply to the part of each cycle 28 having the negative differential pressure, since it is possible in this case to find a balance between a quick, reliable and gentle return of the bag material 5 to the wall 7.

Alternatively or additionally, however, it is also possible for the pressure curves of the cycles 28 to differ from one another, for example in order to assist the beginning of the peeling process using an elevated positive differential pressure 25 at the start, i.e. in a first cycle 28. Alternatively or additionally, the positive differential pressure 25 can be increased over the cycles 28, in particular such that once the bag material 5 has already begun to peel away from the wall 7, the remaining volume in the collapsed bag 2 can be minimised to optimise the degree of peeling. This can also be combined by, for example, increasing at least a maximum positive differential pressure 25 in the first and last cycle 28 compared with a maximum positive differential pressure 25 in one or more intermediate cycles 28.

Figure 2:
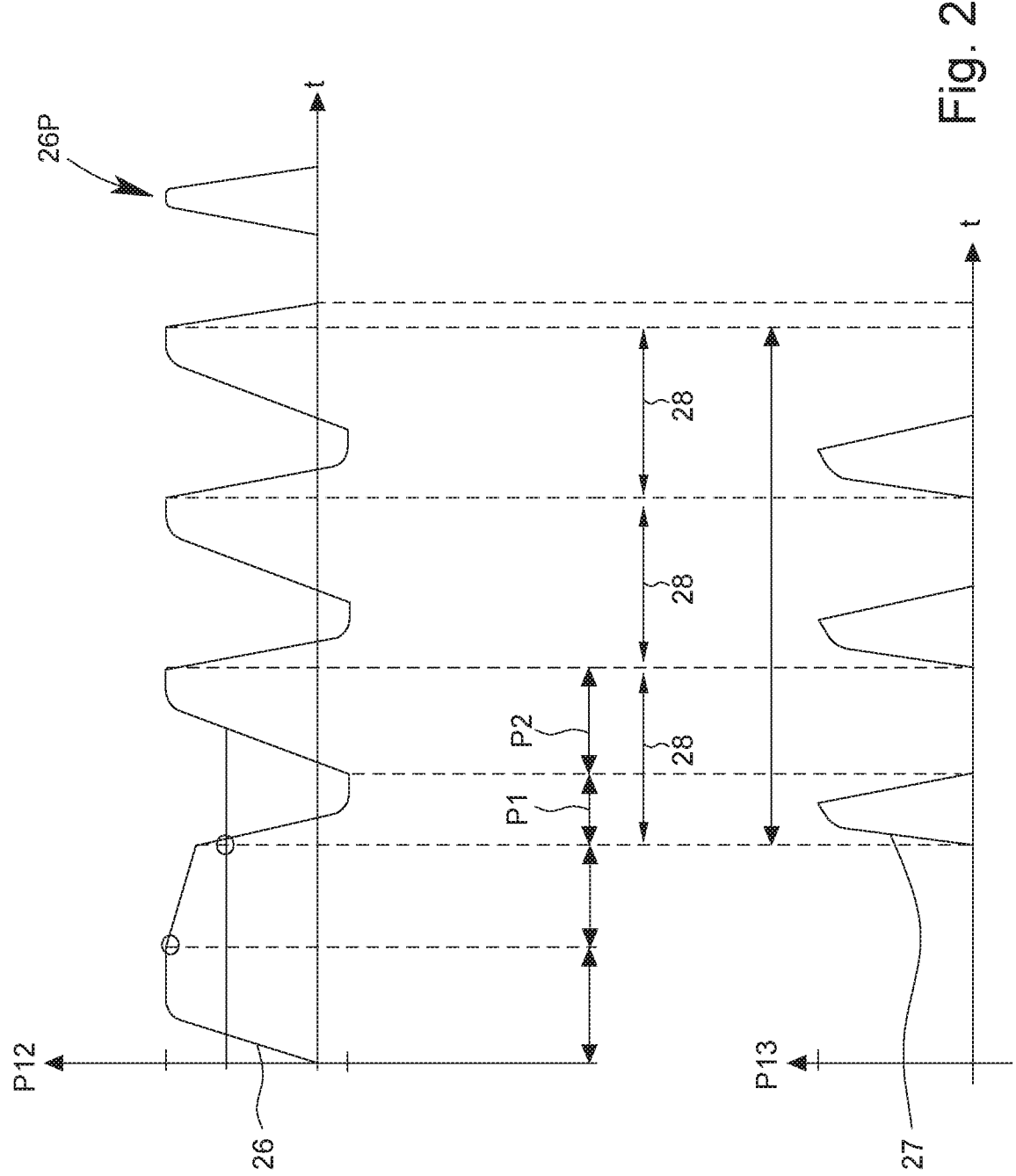
FIG. 2 shows schematic pressure curve graphs in the method for peeling away the bag material.

By way of example, FIG. 2 shows an extraction-side pressure curve 26 above a ventilation-side pressure curve 27 over the process time t. In this case, the time axis corresponds to a zero line of the pressure based on the ambient (air) pressure or to said ambient pressure.

In the example shown, the peeling process includes three cycles 28. However, just two or more than three cycles 28 can also be provided.

In the cycles 28, the extraction-side pressure P12 is optionally greater initially than the ventilation-side pressure P13. As a result, the bag 2 can be pressed against the wall 7.

Afterwards, the direction of the pressure differential 25 is reversed by decreasing the extraction-side pressure P12 and increasing the ventilation-side pressure P13. This collapses the bag 2 and/or detaches bag material 5 from the wall 7. Whereas the ventilation-side pressure P13 is greater than the extraction-side pressure P12, the extraction-side pressure P12 can drop below the ambient pressure at least in one segment, as indicated by the extraction-side pressure curve 26 dropping below the time axis. However, this is not necessary.

Next, by reversing the direction of the pressure differential (also referred to as "pressure reversal" hereinafter), the extraction-side pressure P12 can become greater than the ventilation-side pressure P13 again. As a result, the bag 2 is re-joined to the wall 7. However, this step can also form a part or the beginning of a following cycle 28.

Therefore, a cycle 28 preferably has exactly two pressure reversals, in which the differential consisting of the extraction-side pressure 12 and ventilation-side pressure 13 changes its sign when the pressure reversals are associated with exactly one cycle 28.

A cycle 28 preferably has exactly one segment provided between two sign changes of the pressure differential between the extraction-side pressure 12 and ventilation-side pressure 13, in which segment the ventilation-side pressure 13 is greater than the extraction-side pressure 12 without interruption. Alternatively, a cycle 28 preferably has exactly one segment provided between two sign changes of the pressure differential between the extraction-side pressure 12 and ventilation-side pressure 13, in which segment the extraction-side pressure 12 is greater than the ventilation-side pressure 13 without interruption.

A cycle 28 preferably has at least one, preferably at least two, differential pressure reversals. The differential pressure becomes alternating as a result.

In the example shown, each cycle 28 is divided into two phases P1, P2, for example. In a first phase P1, the ventilation-side pressure curve preferably starts with a ventilation-side pressure P13 that may correspond to ambient pressure or normal pressure. In the example shown, the ventilation-side pressure P13 initially increases steeply in a ramp-like manner and then transitions into another ramp-like rise of the ventilation-side pressure P13 at a lesser gradient. Next, the ventilation-side pressure P13 of the ventilation-side pressure curve 27 falls again in a ramp-like manner, in particular as far as to ambient or normal pressure.

In the example shown, the extraction-side pressure curve in the first phase P1 starts with an extraction-side pressure P12 that is above ambient or normal pressure; in the first phase P1, said pressure initially drops in a ramp-like manner to normal pressure and then below ambient or normal pressure, and subsequently transitions into a constant extraction-side negative pressure P12.

As a result, in the first phase P1, a differential pressure applied over the bag material 5 or bag 2 is produced, which differential pressure is (optionally) initially greater on the extraction side than on the ventilation side and then becomes greater on the ventilation side than on the extraction side as the cycle progresses, a maximum being formed in the process and the differential pressure then dropping again.

In the second phase P2, the ventilation-side pressure curve 27 is at least substantially constant and/or the ventilation-side pressure P13 is at normal or ambient pressure.

In the second phase P2, the extraction-side pressure P12 of the extraction-side pressure curve 26 increases in a ramp-like manner, passing normal or ambient pressure and/or the ventilation-side pressure P13 in the process. In this way, the differential pressure 25 applied over the bag 2 or bag material 5 changes sign.

As the cycle continues, the ventilation-side pressure P12 increases further, preferably in a ramp-like manner, the extraction-side pressure P12 being greater than the ventilation-side pressure P13. The extraction-side pressure P12 then transitions from a curve increasing in a ramp-like manner into a plateau-like, at least substantially constant curve.

Next, a second or additional cycle 28, possibly similar to the first cycle 28 in terms of the pressure curves 26, 27, can begin. In the example shown according to FIG. 2, a total of three cycles are shown. By contrast, however, more or fewer cycles can be provided, for example two, four, five or six cycles 28.

At the end of the final cycle 28, the extraction-side pressure P12 and the ventilation-side pressure P13 are brought back to ambient or normal pressure. In the example shown, the ventilation-side pressure P13 is already at normal or ambient pressure at this time or in the second phase of the final cycle 28. The extraction-side pressure P12 is initially still above normal or ambient pressure and is thus reduced to normal or ambient pressure, preferably in a ramp-like manner. The peeling process is preferably complete at this point.

In the example shown, the peeling process is optionally initiated by a pressure curve 26, 27 in which the extraction-side pressure P12 initially increases above the ventilation-side pressure P13 and/or above ambient pressure, before remaining constant and partly dropping again in a ramp-like manner. This curve is preferably used for preparation, in which faulty placement of the container 4 in the chamber 14 or a gross leak on the container 4 or bag 2 can be detected before the peeling process begins. Faulty placement or a gross leak of this kind would be detected, for example, by the ventilation-side pressure following the extraction-side pressure (in part).

After the final cycle 28, the chamber 14 can be opened to eject the container 4. In this respect, the chamber 14 is preferably designed such that the container 4 is initially held in the region of its extraction opening 9 on a closure part of the chamber 14 or on the spike 19, and is removed by detaching the closure part or withdrawing the spike 19 from the chamber 14.

It is also preferable for the container 4 to be detached from the spike 19 after the completion of the peeling process or the final cycle 28 by means of an overpressure (or by being blown out) on the extraction side 12 when or after the chamber 14 is opened. In the example shown, this is done by means of a blow-out pressure impulse 26P in the extraction-side pressure P12. However, this is not necessary and can also be done in another manner or later.

The extraction-side pressure curve 26 is preferably generated by the extraction-side pressure device 23, in particular in conjunction with the extraction-side valve 20. The ventilation-side pressure curve 27 is preferably generated by means of the ventilation-side pressure device 24, optionally using the ventilation-side valve 21. The pressure devices 23, 24 are preferably designed for corresponding pressure generation, pressure control and/or pressure regulation.

Figure 3:
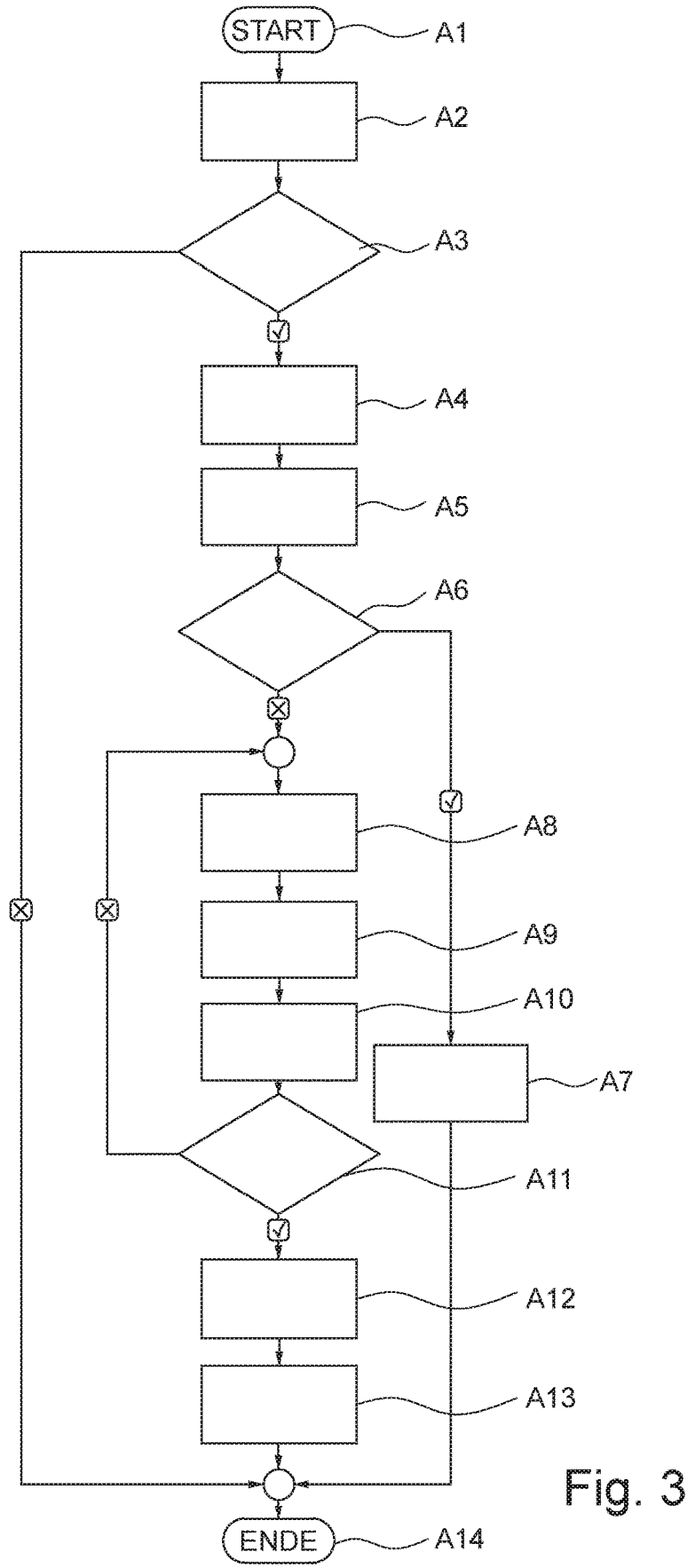
FIG. 3 is a block diagram relating to the peeling process.

FIG. 3 is a schematic block diagram of the peeling method. The sequence preferably starts at step A1. In step A2, a container 4 is preferably automatically placed in the chamber 14 and the chamber 14 is closed.

In step A3, a check is carried out, preferably by means of sensors, as to whether a container 4 is located in the chamber 14. This can be done capacitively, optically, inductively or by an initial pressure test, for example. If a container 4 has been detected in the chamber 14, the peeling process begins in step A4.

First, in step A5 gross leaks are detected or analysed. In this step, perforated or torn bag materials 5 or other defective seals can be detected beforehand by applying pressure and detecting sharp pressure losses.

In step A6, if a gross leak is detected, the test or the peeling process is aborted by means of step A7. Gross leaks and/or the container leaks are preferably detected, although this is not necessary.

In step A8, the actual peeling process begins, preferably for a first cycle 28, by reducing the extraction-side pressure, in particular by generating a vacuum and/or negative pressure at the extraction side. Alternatively or additionally, in step A9 an overpressure is applied to the ventilation side. Overall, a differential pressure 25 is thus generated from the ventilation side 13 towards the extraction side 12, thereby peeling the container material 5 away from the wall 7.

In step A10, a venting phase is preferably carried out. This can begin with a blow-out time, in which the bag material 5 is re-joined to the inner face 6 of the wall 7 by pressure from inside in order to reach the initial state again before the first cycle 28. Next, the extraction side 12 and/or ventilation side 13 can optionally be brought to normal pressure or ambient pressure.

Then, in step A11 a check is carried out as to whether the intended number of cycles 28 has already been reached. If this is not the case, steps A8 to A10 are repeated until the intended total number of, for example, three or four cycles 28 has taken place.

If the intended number of cycles 28 has taken place, in step A12 the container material 5 the bag material 5 is optionally re-joined to the inner face 6 of the wall 7 by an overpressure within the bag 2 or a differential pressure between the extraction side 12 and the ventilation side 13.

Next, in step A13 the chamber 14 can be vented, in particular by connecting the extraction side 12 and the ventilation side 13 to the surroundings or by establishing ambient pressure in another manner.

Following this, the chamber 14 can be opened and optionally the container 4 can be blown out by means of the blow-out pressure impulse 26P that follows the peeling process.

The peeling process then ends with step A14, although it can also seamlessly transition into further test processes, in which case steps A12 to A14 are optional.

A period length, which corresponds to the length of a cycle 28, preferably lasts more than 0.5 s, preferably more than 0.7 s, in particular more than 1 s, and/or less than 3 s, preferably less than 2 s, in particular less than 1.5 s. The length of a phase of positive differential pressure 25 is preferably ⅓ or half said period length. This has been found to be advantageous in terms of good peeling success and simultaneously acceptable throughput.

The, in particular maximum (positive), differential pressure 25, in particular in the peeling direction or from the ventilation side 13 towards the extraction side 12, is preferably more than 100 kPa, preferably more than 150 kPa and/or less than 600 kPa, preferably less than 400 kPa, in particular less than 250 kPa. This can achieve reliable, rapid and sufficiently gentle peeling.

Figure 4:
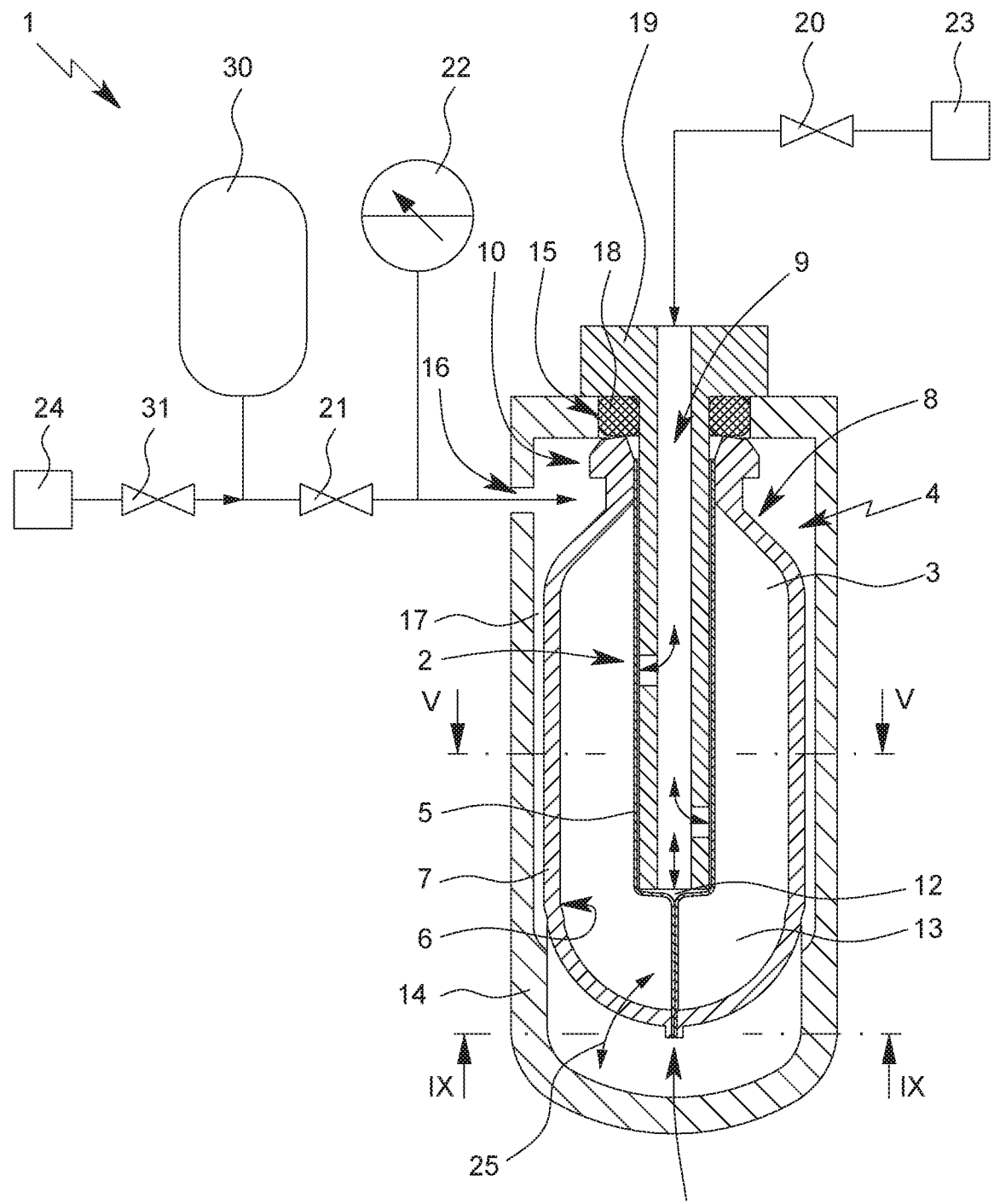
FIG. 4 is a schematic cross section through a proposed system for determining the degree of peeling.

FIG. 4 shows another system 1 (in particular for determining the degree of peeling); in the following, only the additions compared with the embodiment according to FIG. 1 will be discussed. Otherwise, reference is made to the explanations given in connection with FIGS. 1 to 3. Moreover, for clarity, it is pointed out that the properties of the system 1 from FIG. 1 can be carried over to that in FIG. 4 and the above-described methods can also be carried out using the system 1 according to FIG. 4.

The system 1 according to FIG. 4 additionally comprises a pressure storage volume 30, which can be brought to a target pressure separately from the container 4 and can then be brought into fluid communication with the ventilation side 13 of the container 4 in order to allow for pressure equalisation between the pressure storage volume 30 and the ventilation side 13.

The pressure sensor 22 is preferably connected to the resulting overall system comprising the pressure storage volume 30 and the ventilation side 13, such that the pressure sensor 22 can measure the pressure resulting from the pressure equalisation.

In this case, when using the system 1, this resultant pressure is used as a parameter for the degree of peeling or to determine the degree to which the bag material 5 has peeled away from the wall 7. In particular, comparison with a threshold value is carried out.

If the degree of peeling is high or at a maximum, the bag 2 is thus able to fully collapse (one example of a bag deemed fully collapsed can be seen in FIG. 4) and the volume between the at least substantially fully collapsed bag 2 and the wall 7 (apart from the spike 19 protruding into the interior space 3, and the bag material volume) is at least substantially fully available for the pressure equalisation, a lower pressure is produced as a result of the pressure equalisation at the original overpressure in the pressure storage volume 30 than if the degree of peeling is lower and thus part of the container interior space 3 is still obstructed by bag material 5 that remains stuck. In this case, the result is a comparatively higher pressure following the pressure equalisation.

Accordingly, a maximum permissible pressure value corresponding to a minimum intended degree of peeling is preferably defined. If the resultant pressure after the pressure equalisation exceeds this threshold value, defective peeling of bag material 5 is preferably automatically detected.

If defective peeling of the bag material 5 is detected, the container 4 is preferably discarded, in particular is automatically ejected and disposed of. In principle, it is also possible to carry out one or more further peeling cycles 28 before ejecting the container 4. However, this brings an increased likelihood of defects in the bag material 5, and so it is preferable to immediately discard and dispose of a container 4 having insufficiently peeled bag material 5.

To achieve reproducible results, prior to the pressure equalisation either the bag material 5 can be joined to the wall 7 by means of overpressure on the extraction side 12, or the bag 2 can be collapsed as far as possible by means of a differential pressure in the opposite direction, in particular by generating a negative pressure or vacuum within the bag.

Preferably, the pressure is equalised regardless of an internal pressure of the container 4 or bag 2, i.e. the pressure on the extraction side 12. For this purpose, the extraction side 12 can be ventilated during the measurement, such that ambient pressure prevails in this region. Alternatively or additionally, the extraction side 12 can be evacuated, or a negative pressure is applied that is as identical as possible for each individual container 4 to be tested in order to prevent influences from stretchier or less stretchy bag material 5 if the bag material 5 has not fully peeled away.

The pressure storage volume 30 can be implemented as a pressure equalisation container having a predefined volume. The ventilation-side pressure device 24 can bring the pressure storage volume 30 to a predefinable pressure by opening a filling valve 31 and/or can fill said volume with a predefinable (gas) volume, thus producing an overpressure. By closing the filling valve 31 and then opening the ventilation-side valve 21, the pressure equalisation can be initiated. The resultant pressure after the pressure equalisation can then be measured by the pressure sensor 22 and analysed.

Figure 5:
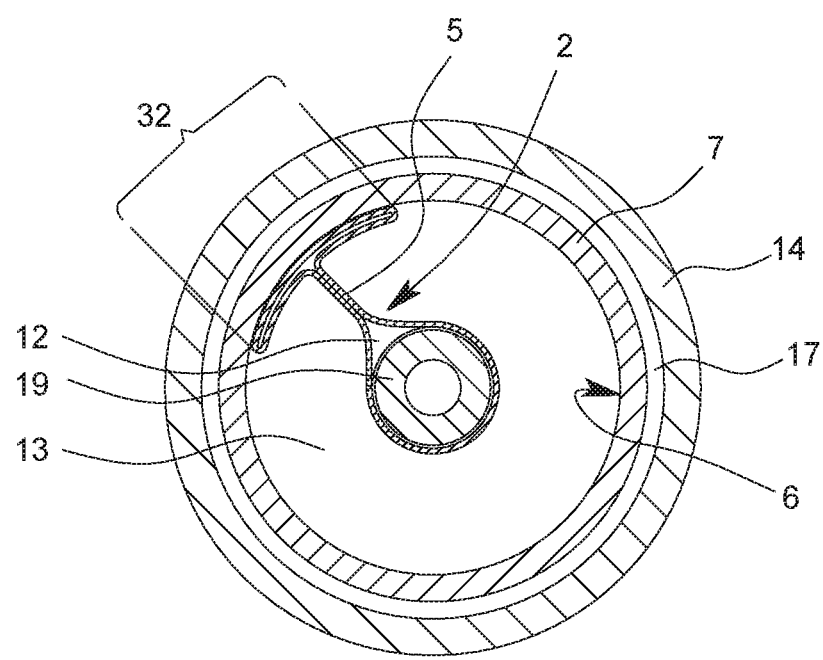
FIG. 5 is a schematic cross section through the test chamber according to the sectional line V-V from FIG. 4.

FIG. 5 is a cross section through the chamber 14 comprising the inserted container 4 and the at least substantially collapsed or maximally collapsed bag 2. The bag material 5 has detached in a large portion of the inner face 6 of the wall 7 and encircles the spike 19 in the example shown. Moreover, the bag material 5 is still stuck to the inner face 6 of the wall 7 in a strip-shaped portion, preferably along an extension between the extraction opening 9 and the ventilation opening 11 and/or transversely thereto over a width referred to as the remaining-strip width 32. In this case, a certain remaining-strip width 32 is advantageous since the bag 2 can abut at least substantially everywhere and so encloses an extremely low residual volume, i.e. is or can be at least substantially fully collapsed.

In addition, it is advantageous for the bag material 5 to remain stuck in a strip-shaped portion longitudinally along the wall 7 since it is possible to achieve or provide at least substantially (only) a radial collapse of the bag 2; this helps prevents an immersion tube or any other extraction device becoming blocked when the container 4 is subsequently used.

The strip-shaped portion can be produced by the bag material 5 being held in the neck region 10 and in the region of the ventilation opening 11. Furthermore, it is preferable for the bag material 5 to be etched asymmetrically in relation to a central axis of the container 4 in the region of the ventilation opening 11 before carrying out a or the peeling method. This specifies a starting point for the peeling and the remaining strip can be formed on an opposite side.

The container 4 can preferably be combined with an extraction device (not shown) comprising an immersion tube that protrudes into the extraction side of the bag 2 through the extraction opening 9. Product can be extracted from the extraction side 12 using the immersion tube. The strip-shaped portion preferably extends at least in the region of an immersion tube opening, which is preferably located at the end of said tube.

In an aspect that can also be implemented independently, the present invention therefore relates to the combination of the proposed container 4 with an extraction device comprising an immersion tube inserted into the bag 2 at the extraction side, the bag 2 sticking to the wall 7 at least at the level of an opening of the immersion tube in a strip-shaped portion longitudinally along the wall 7.

While maintaining a remaining-strip width 32 over which the container material 5 remains stuck to the container wall 7, the peeling is preferably more than 45°, in particular more than 60°, in particular more than 90°, based on 360° of the internal circumferential line of the wall 7.

Particularly preferably, the remaining-strip width 32 is between 50% and 150%, preferably more than 75% and/or less than 125% of $UR = PI \cdot (RI-DK/4) - RI$. Here, UR relates to the length of the internal radial portion of the wall 7 in which the bag material 5 remains stuck over the remaining-strip width 32. PI relates to the irrational constant starting with the numbers 3.1415 (pi). RI relates to the internal radius of the container 4 or half the diameter extending from wall 7 to wall 7 through a central axis. DK relates to the external diameter of the spike 19. The external diameter DK of the spike 19 is preferably less than half, in particular less than ¼, of the internal diameter of the container 4.

Figure 6:
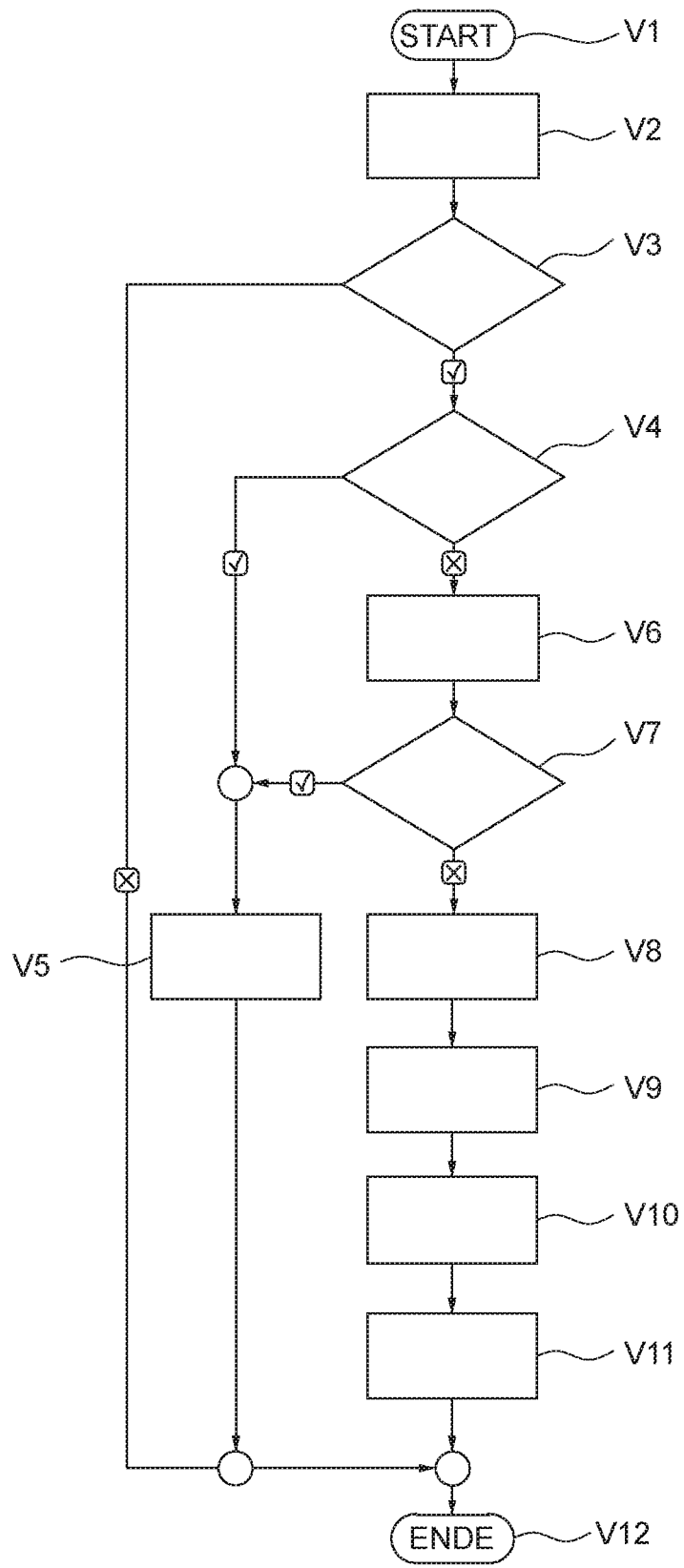
FIG. 6 is a schematic block diagram relating to the determination of the degree of peeling.

FIG. 6 is a schematic block diagram, on the basis of which an example sequence of a proposed volume test or a test or determination of the degree of peeling will be explained below.

The method begins with step V1, after which in step V2 the chamber 14 is closed, and in step V3 the basic or correct insertion of the container 4 into the chamber 14 is checked. This can be done using sensors, in particular as described above. If no container is inserted, the method is terminated or restarted with step V1 or V2. Steps V1, V2 and/or V3 can be omitted if the container is still inserted from a previous method.

Next, in step V4 an optional check is carried out as to whether a gross leak has already been detected, in particular in the peeling method preferably carried out beforehand. If a gross leak has already been detected, the test in step V5 is aborted and the container 4 is discarded or rejected and/or disposed of.

Otherwise, in step V6 the determination of the total volume of the pressure storage volume 30, the volume of the system 1 available on the ventilation side due to the collapsing of the bag 2 and the volume therebetween, or of the degree of peeling or the corresponding parameter or pressure, is started.

In the example shown, this is done in particular by carrying out another pre-check for gross leaks in step V7. All or some of steps V1 to V7 are optional, but have proven preferable for reasons of efficiency and speed.

The actual determination of the degree to which the bag 2 has peeled away from the inner face 6 of the wall 7 of the container 4, or of the ability of the bag 2 to sufficiently collapse, begins in step V8 with the preparation of the pressure storage volume 30. In particular, the pressure storage volume 30 is brought to a predefined or predefinable pressure, preferably overpressure. Alternatively or additionally, the predefined pressure storage volume 30 is filled with a likewise predefined gas volume, an overpressure forming in the pressure storage volume 30 in the process.

In step V9, the pressure storage volume 30 is then disconnected from the ventilation-side pressure device 24, in particular by closing the filling valve 31. Next, the pressure storage volume 30 is connected to the ventilation side 13 by opening the valve 21. A predefined pressure storage volume 30 under overpressure is thus connected to the ventilation side. In doing so, gas, in particular air, or another suitable compressible medium, flows out of the pressure storage volume 30 through the ventilation-side valve 21 into the chamber 14 and through the ventilation opening 11 into the container 4 on the ventilation side. In the process, the pressure between the pressure storage volume 30 and the ventilation side 13 is equalised.

The resultant pressure after the pressure equalisation between the pressure storage volume 30 and the ventilation side 13 corresponds to the total volume of the pressure storage volume, the connecting lines, the ventilation-side volume of the chamber 14 and the volume within the container 4 not obstructed by the bag material 5. On the basis of these last-mentioned components, therefore, conclusions can be drawn on the degree of peeling. Accordingly, in step V10, the degree of peeling is determined or checked, preferably by measuring the pressure produced on the ventilation side following the above-described pressure equalisation, and/or after comparing this pressure with a default, a threshold value or the like.

In step V11, the chamber 14 can then (preferably optionally) be ventilated (brought to ambient pressure) on the extraction side and/or ventilation side and opened to remove the container 4. In step V12, the method is then terminated and can be restarted using another container 4.

The pressure storage volume 30 is preferably similar to the volume of the container 4. In particular, the pressure storage volume 30 is more than 0.5 times, preferably more than 1 time and/or less than 10 times, preferably less than 5 times, the container volume. In particular, the container volume is the volume of the container 4 within the bag 2 when the bag material 5 is arranged entirely on the wall 7. A pressure storage volume 30 similar to the container volume is advantageous in that high sensitivity or resolution can be achieved, preferably while having a preferably small volume of the chamber 14, in particular a volume that is less than three times or less than twice the container volume. If the pressure storage volume 30 is larger, the resultant pressure changes relatively little with respect to the pressure of the pressure storage volume 30, and if the pressure storage volume 30 is much smaller than the container volume, the result is a comparatively low pressure that accordingly depends on the degree of peeling to an insignificant extent.

At the beginning of the method, the pressure storage volume 30 is preferably brought to an overpressure that exceeds the extraction-side pressure or ambient pressure when the extraction side 12 has been ventilated, preferably by at least 60 kPa, preferably by more than 100 kPa and/or less than 400 kPa, preferably less than 300 kPa. An overpressure in the pressure storage volume 30 of between 50 kPa and 200 kPa is particularly preferable since this allows the degree of peeling to be reliably determined without placing significant strain on the bag 2 during the pressure equalisation.

In another aspect of the present invention, which can also be implemented independently, the degree of tightness of the bag 2 is determined, preferably also using the system according to either FIG. 1 or FIG. 4. In the process, an accuracy that allows fine leaks, thin points or the like to be identified is preferably achieved in order to guarantee reliability later on.

Figure 7:
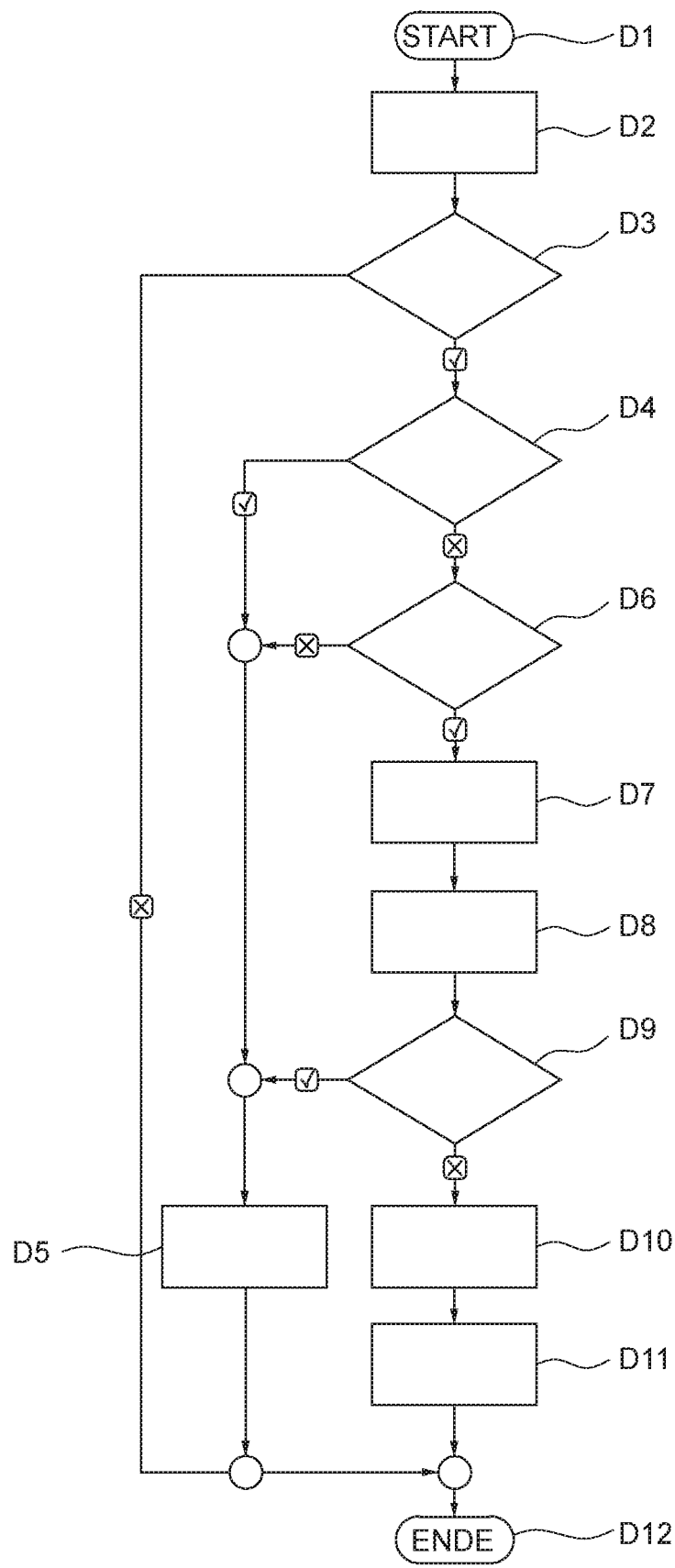
FIG. 7 is a schematic block diagram relating to the tightness test.

FIG. 7 is a schematic block diagram on the basis of which a preferred tightness test will be described in more detail.

The method preferably starts in step D1, after which in step D2 the chamber 14 comprising the inserted container 4 is closed. In step D3, a check is preferably carried out as to whether a container 4 is inserted in the chamber 14.

In step D4, it is preferably determined whether a gross leak has already been identified in a previous method, for example the peeling method. If a gross leak has been identified, the test is preferably aborted in step D5. In this case, step D4 can correspond to or match step V3 or steps A4, A5, or can take account of the results of one or more of these steps.

In step D6, a check is preferably carried out as to whether a sufficient degree of peeling has been achieved. In doing so, it is in particular checked whether the resulting pressure following the pressure equalisation is low enough, i.e. is below a threshold value. If this is not the case, the test is likewise aborted at step D5. Step D6 can implement all or part of the method described in connection with FIG. 6, for example steps V8 to V10.

Steps D1 to D6 are preferably optional and need not all be carried out. In particular, the tightness test can also be carried out without steps D1 to D6.

The proposed method for testing the tightness begins with step D7. In step D8, relatively gross leaks are first searched for. To do so, the ventilation side 13 is preferably brought to negative pressure or evacuated, for example by means of the ventilation-side pressure device 24. In this context, the pressure storage volume 30 is not necessary, can be sealed off by means of a valve (not shown), or a system 1 according to FIG. 1 can be used.

For the tightness test, the ventilation-side valve 21 is then closed. By means of the pressure sensor 22, it is possible to identify a deterioration in the vacuum or a pressure increase that correlates with the bag 2 having a degree of leakage.

In step D8, after a brief waiting time to prevent inaccurate measurements, a "gross-leak analysis" is carried out, in which the pressure curve of the vacuum is studied for relatively sharp pressure increases. If a relatively gross leak is identified in step D9 when analysing the measured pressure increase, the test is aborted in accordance with step D5.

If no gross leak is identified, a "fine-leak analysis" follows in step D10, in which a pressure increase is identified by the pressure sensor 22 after a predefined waiting period. If the pressure increase exceeds a particular threshold value, this is established to mean defective tightness and the container 4 is discarded, rejected, disposed of or the like, preferably automatically.

If the pressure increase is below the predefined threshold value, the container 4 has passed the test and thus has a sufficient degree of tightness. The method then ends in step D11 with the ventilation side 13 being ventilated, the extraction side 12 optionally being vented, the chamber 14 being opened and/or the container 4 being ejected, and is then terminated in step D12.

Figure 8:
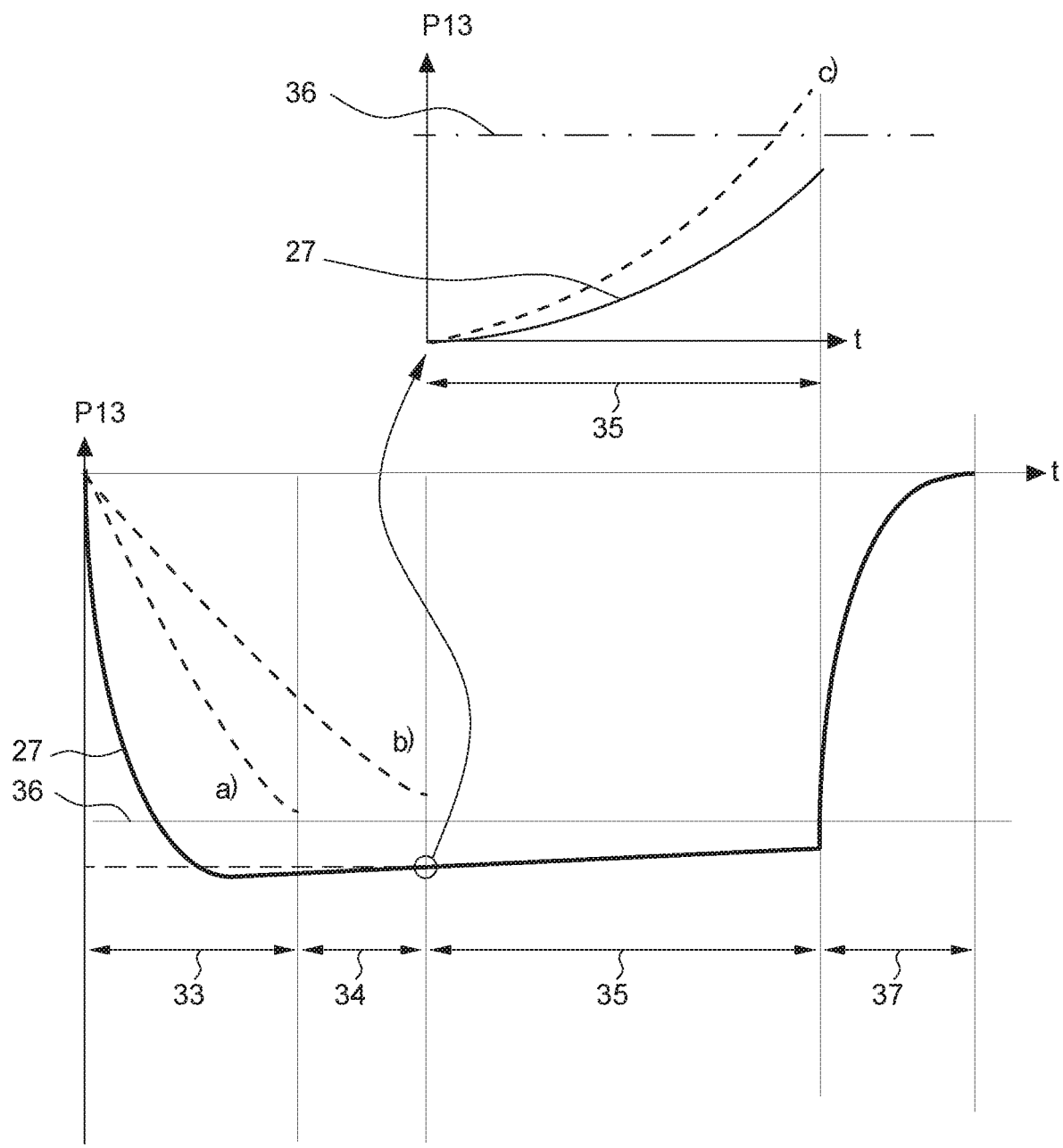
FIG. 8 is a schematic pressure curve diagram in the tightness test method.

FIG. 8 shows a corresponding pressure curve for the ventilation-side pressure P13 for the tightness test, and above that an enlarged detail in relation to the y-axis, which represents the ventilation-side pressure 13. In the lower graph, the x-axis shown corresponds to the time t and intersects the y-axis, representing the ventilation-side pressure P13, at the zero point or at ambient pressure.

In a first segment 33, the test is prepared by evacuating the ventilation side 13 or generating a negative pressure, in particular by pumping out air. In the process, the ventilation-side pressure P13 drops at a decreasing rate and transitions over time into an asymptotic curve, reaching an absolute minimum. Next, the ventilation side 13, which has been evacuated or placed under negative pressure, is closed. The extraction side 12 is preferably at ambient pressure or an overpressure in relation to the ventilation side 13 or the surroundings.

If a sufficient vacuum or sufficient negative pressure cannot be generated in this segment 33, or the negative pressure that can be generated does not reach a threshold (as shown by dashed line in the example shown according to FIG. 8), a gross leak is preferably detected (see also the discussion on steps D8 and D9 from FIG. 7). In this case, the measurement may be aborted and the affected container 4 discarded.

If a sufficient or predefined vacuum or predefined negative pressure is reached in the first segment 33, a waiting period is optionally adhered to initially in the second segment 34. During this waiting period, the ventilation-side pressure P13 only changes slightly or adjusts itself. In the example shown, the ventilation-side pressure P13 increases slightly, for example due to leakages in the system 1.

Next, in a third segment 35, the actual measurement is taken, corresponding to the determination of fine leaks as explained in relation to step D10 from FIG. 7. In this segment, the ventilation-side pressure increases again, caused in any case by leakages in the system 1. The degree and/or rate of this pressure increase is higher if the bag 2 also has leakages in addition to those in the system 1. Leaks may involve either holes or thin points that do not form a sufficient diffusion barrier.

The top graph from FIG. 8 shows this third segment 35 having an enlarged y-axis, wherein a dash-dot line indicates a threshold value 36 and the x-axis, acting as the time axis, intersects the y-axis, representing the ventilation-side pressure P13, at the ventilation-side pressure P13 at the start of the third segment 35. This is done for illustration purposes, but can also correspond to the approach for detecting fine leaks since a pressure differential between the start and end time of the third segment 35 is used to determine fine leaks.

In a variant, the threshold value 36 is set at the start of the third segment 35 depending on the ventilation-side pressure P13, the threshold value 36 being set at an expected pressure increase caused by leakage plus a tolerance value above the ventilation-side pressure P13 at the start of the third segment 35. The threshold value 36 can thus vary based on the absolute pressure or an in particular fixed, predefined or predefinable threshold value 36 that is based on the difference in the ventilation-side pressure P13 between the beginning and end of the measurement or of the third segment 35.

At the end of the measurement or of the third segment 35 or after a predefined waiting time, the increase in the ventilation-side pressure P13 can be identified as the pressure differential and preferably compared with the threshold value 36.

Alternatively or additionally, the threshold value 36 can also be predefined as an absolute ventilation-side pressure P13. In this case, the threshold value 36 is preferably set at an expected pressure increase caused by leakages plus a tolerance value above a negative minimum pressure to be reached. If, in the first segment 33 for example, a negative pressure of at least a target value, for example 60 kPa, is intended to be reached, the threshold value 36 can be set at a negative pressure above this target value, for example of 40 to 300 Pa above this target value.

If the pressure differential or the ventilation-side pressure P13 exceeds the threshold value 36 (as shown by dashed curve c) in the top graph), a fine leak is deemed to have been detected. The container 4 is then preferably rejected or discarded. However, if the leakage is so minor that it correlates with the typical leakages of the system 1 (indicated by the solid line in the top graph) or if the threshold value 36 has not been reached or exceeded, the tightness test is deemed to have been passed.

In the subsequent fourth segment 37, the ventilation side 13 is preferably ventilated again (brought to normal pressure) and the method is complete. In the process, the ventilation side 13 can be connected to the surroundings, leading to an asymptotic pressure drop to ambient pressure level, as shown by way of example in FIG. 8.

The length of the third segment 35 is preferably more than 0.5 s, in particular more than 1 s and/or less than 5 s, preferably less than 4 s or 3 s. As a result, a sufficient level of accuracy can be achieved while simultaneously carrying out the test quickly.

The threshold value 36 preferably depends on the tightness of the overall system or system 1. For example, the threshold value can be around 10 or just 100 Pa above the ventilation-side pressure P13 at the start of the measurement or the start of the segment 35, preferably by more than 60 Pa or 80 Pa and/or by less than 200 Pa, preferably by less than 150 Pa or 120 Pa.

The proposed methods can be combined in different ways either fully or in part. Particularly preferably, the bag material 5 is peeled away and/or the degree of peeling determined and/or the tightness tested immediately one after the other, in particular without swapping or changing the container 4, by means of the same chamber 14 and/or continuously. In the process, it is possible to omit some of the aforementioned steps. For example, the peeling method is carried out in any case within the scope of steps A8 to A11. Alternatively or additionally, the method for determining the degree of peeling is carried out within the scope of steps V8 to V10. Alternatively or additionally, the method for the tightness test is carried out in any case within the scope of step D10, preferably steps D8 to D10.

The proposed system 1 is preferably designed to carry out one or more of the methods according to the present invention. In this case, the system 1 can comprise one or more chambers 14. The methods can thus be carried out, preferably one after the other, in the same chamber 14 or in two or more chambers 14. If different chambers 14 are provided for the different methods, each container 4 is preferably transferred from a first chamber 14 into a following chamber 14 to carry out another of the proposed methods.

For example, the system 1 according to the example shown in FIG. 4 is suitable for carrying out the method for forming the collapsible bag 2 by generating the varying, in particular alternating, differential pressure 25 by means of the extraction-side pressure device 23 or ventilation-side pressure device 24. Alternatively or additionally, the system 1 is also designed to carry out the method for determining the degree of peeling or the collapsibility or the corresponding parameter by means of the pressure storage volume 30. Alternatively or additionally, the system 1 according to FIG. 4 is also suitable for determining the degree of tightness of the bag using the proposed method. The system 1 is therefore capable of using the same chamber 14 to carry out one or more of the proposed methods in different combinations. Preferably, the system 1 is also configured to do so by control technology.

Alternatively or additionally, the proposed system 1 can comprise a plurality of stations, each comprising a chamber 14 and being designed to carry out one or more of the proposed methods. In this way, the same system 1 can be used to supply a plurality of containers 4 simultaneously to the proposed method(s). By making the methods concurrent in this manner, the overall throughput can be increased.

It is also preferable for the method for forming the bag 2 or ensuring the functionality of the collapsibility of the bag 2 to be carried out first, followed by the method for determining the degree of peeling. Moreover, the method for determining the degree of tightness is preferably carried out after the bag 2 has been formed and/or the degree of peeling determined.

Optionally, in each of the three above-described method steps (peeling away the bag, determining the degree of peeling and the tightness test) and regardless of the situation in the other methods steps, the ventilation opening 11 of the container 4 can be preferably reversibly widened, in particular by means of insertion into the chamber 14 and in particular by radial compression in its position in the chamber 14, in such a way that, when in the chamber 14, the container comprises a widened ventilation opening 11 or a ventilation opening 11 having an enlarged (hydraulic) diameter or an enlarged opening cross-sectional area compared with an initial or resting position. As a result, the method speed and accuracy can be improved.

This is preferably made possible by deforming the wall 7 in the region of the ventilation opening 11, such that, by everting the bottom portion of the container 4, which portion comprises the ventilation opening 11, the slot-like ventilation opening 11 is reversibly squeezed or spread open. This can be done by the chamber 14 or by a container mount in the chamber 14, or in another way. Particularly preferably, the ventilation opening 11 is widened by a step, shoulder or an in particular conically tapered region of the chamber 14. In a region of this kind, the internal diameter of the chamber 14 is preferably less than the external diameter of the wall 7 of the container 4 when in its initial state; this leads to a radial application of pressure and thus to the ventilation opening 11 spreading open when the container 4 is inserted into the chamber 14. The internal diameter of the chamber 14 at the level of the ventilation opening 11 is preferably at least substantially axially symmetrical with a longitudinal axis of the chamber 14. Consequently, the ventilation opening 11 can be spread open regardless of the rotational orientation of the container 4 with respect to the chamber 14 in relation to a longitudinal axis of the container 4 and/or of the chamber 14.

In another aspect, which can also be implemented independently, the present invention also relates to a computer program product or a computer-readable storage medium comprising program code means that are designed, when executed, in particular on a processor, computer, controller or the like, to carry out a method according to the present invention. For this purpose, the system 1 and/or the components of the system 1 can have a controller (not shown) that contains or can execute said computer program product, as a result of which the system 1 can be operated as described. In particular, the valves 20, 21, 31 and/or the pressure devices 23, 24 are actuated accordingly.

Another aspect of the present invention, which can also be implemented independently, relates to the use of the system 1 for carrying out one or more aspects of the above-described methods, in particular for producing a bag 2 or peeling the bag material 5 away from the inner face of the wall 7 and/or for using the system 1 to test the degree of peeling or to test the total volume available when the bag 2 is collapsed and/or for testing the tightness of the bag 2 or bag material 5 in terms of the extraction side 12 being sealed, in particular in an air-tight manner, with respect to the ventilation side 13 or vice versa.

In another aspect, the present invention relates to the design and production of the container 4 or the production and testing of the bag 2 of a container 4 designed or produced according to this aspect.

The container 2 comprises the extraction opening 9, which allows preferably fluid container contents to be filled in and the container contents to be extracted from the interior space 3 enclosed by the bag 2.

The container 4 preferably comprises the at least substantially dimensionally stable or rigid outer container 8 in which the bag 2 is arranged or formed. The outer container 8 is preferably sufficiently resilient to allow for a certain level or reversible deformation of the outer container 8 when a force is exerted on the outer container 8. This can be achieved by the outer container 8 consisting of a plastics material, in particular one that has thicker walls compared with the bag material 5, for example polyethylene or polypropylene. The outer container 8 preferably has sufficient resilience in order to be reversibly deformable to a certain degree while permanently retaining its shaping stability at the same time, in order to be able to automatically return the deformation at least substantially to the original state, as for example in a PET drinks bottle or the like. The bag 2 is arranged within the outer container 8 and is in contact with the subsequent container contents since the bag 2 receives the container contents through the extraction opening 9.

The internal bag 2 and the outer container 8 are preferably formed of different thermoplastics that do not coalesce with one another.

By means of the ventilation opening 11 arranged in the outer container 8, the bag material 5 forming the bag 2 can equalise a pressure difference prevailing between the outer container 8 and bag 2, preferably by equalising the pressure while collapsing the bag 2.

To produce the container 4, it is preferable to first produce a preform, consisting of two coaxial tubes having a length suitable for producing the container, between two open halves of a blow mould in the coextrusion blowing process. The blow mould halves are closed (thereby forming the blow mould) and in doing so the excess material is squeezed out in the bottom region of the container 4 being produced while forming an outwardly protruding bottom seam. This is done in such a way that, in the seam region, the material of the outer container 8 in contact is welded together, the tube forming the bag 2 is clamped, axially fixed in place and welded between the wall portions of the outer container 8, and pressure is applied to the bag 2 such that the walls of the preform are joined to the contour of the blow mould from inside.

When the blow mould is closed and the associated formation of the bottom seam takes place, the seam of the bag 2 is preferably axially fixed in place in the seam of the outer container 8 at least in portions. Particularly preferably, at least one ventilation opening 11 is formed by cutting off the bottom seam at least in part, but preferably not fully, after the shaping, such that at least a portion of the seam of the bag 2 remains fixed in place in the seam of the outer container 8.

Next, a radial force acting in the seam direction is introduced in the bottom region of the container 4 or outer container 8, preferably in such a way that the bottom seam of the outer container 8 breaks and thus an elongate, in particular slot-like ventilation opening 11 is formed, which allows ambient air to flow in between the bag 2 or bag material 5 and the outer container 8 for the purpose of pressure equalisation.

The temperature of the preform is preferably between 40° C. and 70° C. when the bottom seam is cut off and/or the outer container 8 is still plastically deformable to a certain extent, such that the deformation caused by the force is at least in part a permanent deformation and is not completely undone by resilient recovery.

The walls of both the bag 2 and the outer container 8, which consist of different thermoplastics, are generally not welded together. Under the effect of the force introduced by the blow mould halves when squeezing out the excess material, the walls of the bag 2 on one hand and the walls 7 of the outer container 8 on the other hand are welded together. In addition, adhesion between the walls of the bag 2 and outer container 8 occurs in some regions of the bottom seam. This is a significant advantage of the method in terms of fixing the bag 2 in place in the bottom region.

The adhesion in this case is such that, when the bottom seam of the outer container 8 breaks, one of the two seam sides remains connected to the seam of the bag 2, whilst the other seam side of the outer container 8 does not remain fixed to the seam of the bag 2. Despite the breakage, therefore, the axial fixing of the bag 2 is ensured, even in embodiments where the seam of the outer container 8 is broken over the entire length. Moreover, this allows for the later formation of the strip-shaped portion or remaining-strip width 32.

Fixing the bag 2 in place is particularly important in applications where a cannula or immersion tube is inserted into the container 4 and where the bag 2 peeling away from the bottom region would lead to the cannula becoming damaged or blocked. The bag 2 cannot be damaged since the bottom seam is only cut off in part, and so the bag 2 is firmly closed by the remaining weld seam on the bag 2, even after the cutting process has been carried out. The formation of the ventilation opening 11 is preferably not generated directly by the cutting process, but rather by the introduction of the force and breaking of the seam. This can also form the slot-like ventilation opening 11, which can subsequently be spread open by applying a preferably radial force in order to peel away the bag material 5 or for the purpose of the test.

In this embodiment, the container 4, consisting of an outer container 8 and a bag 2, is bottle-shaped. At its neck region 10, said container comprises a protrusion arranged on the end of the bottle neck or neck region 10, at which the extraction opening 9 is located. In the bottom region 4 of the container 1, the bottom seam is arranged in the extension of a container central axis and forms the ventilation opening 11 in the wall 7 of the outer container 8. In the example shown, the protrusion is moulded solely from the material of the outer container 8.

On its end face pointing towards the ventilation opening 9, the neck region 10 preferably comprises an in particular rectangular protrusion. This protrusion has the special feature whereby it is moulded from both material of the outer container 8 and material of the bag 2, such that the bag 2 is fixed in place in the region of the bottle neck 6.

Figure 9:
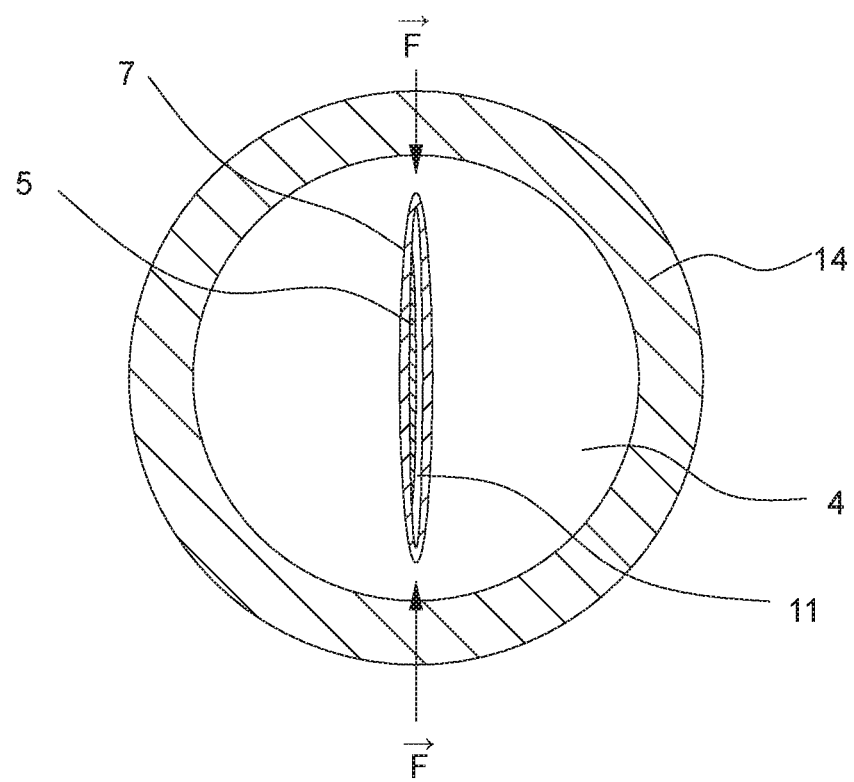
FIG. 9 is a section through the container in the region of the ventilation opening.

FIG. 9 is a section through the bottom region of the container 4 at the level of the ventilation opening 11. The design of the bottom seam, which is formed in the centre from the walls of the bag 2 and is defined on both sides by the walls of the outer container 8, can be clearly seen. Also shown are the radial forces F, which preferably act at least in the seam direction or the direction of the longitudinal extension of the ventilation opening 11 and are preferably introduced into the bottom region or at the bottom of the wall 7 of the outer container 8 in order to widen the hydraulic diameter or opening cross-sectional area of the ventilation opening 11, in particular by temporarily and/or reversibly deforming the outer container 8 and/or the portions of the wall 7 that form the ventilation opening 11. In this embodiment, an optionally introduced axial force is not shown or provided.

In the special embodiment in question here, the bag 2 remains stuck to the outer container 8 and the ends of the bottom seam 11 on one side of the bottom seam 5, and is therefore axially fixed in place. It is also preferable for the bag material 5 to remain stuck in a strip-shaped manner along the inner face of the outer container 8. These two factors prevent, in particular in a synergistic manner, the clogging up of an extraction device for container contents, for example an immersion tube. On the opposite side to the neck region 10, the ventilation opening 11 is formed, which is defined by the outer container 8 and the bag 2 and can thus equalise a pressure difference prevailing between the bag 2 and outer container 8.

The container 4 is preferably designed to be used in the pharmaceuticals sector. In particular, the container 4 can be sterilised. The container 4 is preferably designed to hold or contain an in particular liquid drug formulation, particularly preferably on the extraction side 13. The drug formulation preferably contains an active ingredient or comprises a pharmaceutically active substance. This may be an acidic solution. The drug formulation can comprise stabilisers such as benzalkonium chloride. However, the container 4 can also be used or be useful for other purposes.

Alternative Aspects and Combinations

Other aspects of the invention are as follows:

1. Method for forming a collapsible bag 2 in the interior space of a container 4 by peeling bag material 5 away from an inner face 6 of a wall 7 of the container 4, the container 4 comprising an extraction opening 9 and a ventilation opening 11 and the interior space of the container 4 comprising an extraction side 12 associated with the extraction opening 9 and a ventilation side 13 associated with the ventilation opening 11, the extraction side 12 and the ventilation side 13 being separated from one another by the bag material 5, and the bag material 5 being stuck to the inner face 6 of the wall 7 of the container 4 when in an initial state, characterised in that a differential pressure 25 is generated between the ventilation side 13 and the extraction side 12 and changed such that the bag material 5 stuck to the wall 7 detaches, thereby forming the bag 2.

2. Method according to aspect 1, characterised in that the differential pressure 25 is changed in an alternating manner such that the bag material 5 stuck to the wall 7 detaches in stages.

3. Method according to either aspect 1 or aspect 2, characterised in that the differential pressure 25 is changed cyclically, each cycle 28 preferably having at least two phases, in one phase, the pressure P13 on the ventilation side 13 being greater than the pressure P12 on the extraction side 12 and/or the differential pressure 25 detaching the bag 2 from the wall 7 of the container, and in another phase, the pressure P13 on the ventilation side 13 being lower than the pressure P12 on the extraction side 12 and/or the differential pressure 25 pressing the bag 2 against the wall 7, and that the differential pressure 25 alternates.

4. Method according to aspect 3, characterised in that the cycles 28 each have a period length 29 of more than 0.5 s, preferably more than 0.7 s, in particular more than 1 s, and/or less than 3 s, preferably less than 2 s, in particular less than 1.5 s.

5. Method according to any of the preceding aspects, characterised in that the in particular maximum differential pressure 25 is more than 100 kPa, preferably more than 150 kPa, and/or less than 400 kPa, preferably less than 250 kPa.

6. Method according to any of the preceding aspects, characterised in that, to produce the bag 2, a wall material forming the wall 7 of the container 4, and the bag material 5 are first made into the shape of the container 4 directly abutting one another, the bag material 5 sticking, in particular adhesively, to the inner face 6 of the wall 7 of the container 4, and the bag 2 then being formed by the bag material 5 peeling away from the wall 7 of the container 4.

7. Method for determining a degree to which a bag 2 has peeled away from the inner face 6 of the wall 7 of a container 4, a volume by which the bag 2 can be collapsed and/or a corresponding parameter, in particular according to any of the preceding aspects, the container 4 comprising an extraction opening 9 and a ventilation opening 11, an interior space of the container 4 comprising an extraction side 12 associated with the extraction opening 9 and a ventilation side 13 associated with the ventilation opening 11, which sides are separated from one another by the bag 2, characterised in that a pressure storage volume 30 is brought to a target pressure and then connected to the ventilation side 13 such that the pressure between the pressure storage volume 30 and the ventilation side 13 is equalised, and the resultant pressure after the pressure equalisation being measured as a parameter or to determine either the degree of peeling or the volume.

8. Method according to aspect 7, characterised in that the pressure storage volume 30 is brought to an overpressure, preferably by being filled with a gas, in particular air, the overpressure preferably exceeding the ambient pressure, in particular by at least 100 kPa, and/or in that the pressure storage volume 30 corresponds to more than half and/or less than four times the volume of the container 4 or bag 2, and/or in that, when the valve 21 between the ventilation side 13 and the pressure storage volume 30 is closed, the pressure storage volume 30 is brought to overpressure, and in that the pressure storage volume 30 is then connected to the ventilation side 13 by opening the valve 21, the extraction side 12 preferably being vented or evacuated.

9. Method for testing the tightness of a bag 2 provided in a container 4, in particular according to any of the preceding aspects, the container 4 comprising an extraction opening 9 and a ventilation opening 11, the interior space of the container 4 comprising an extraction side 12 associated with the extraction opening 9 and a ventilation side 13 associated with the ventilation opening 11, which sides are separated from one another by the bag 2, characterised in that overpressure is applied to the extraction side 12 compared with the ventilation side 13 such that the bag 2 is joined to the wall 7 of the container 4, and in that together with or by means of the ventilation side 13, a closed test volume is generated, in which a pressure or pressure differential is identified following or depending on a test duration and is used as an indicator for the degree of tightness of the bag 2 provided in the container 4.

10. Method for producing a container 4 comprising an internal bag 2 and/or for testing a container 4 comprising an internal bag 2, characterised in that the container 4 comprises a non-circular, preferably elongate, in particular slot-like, ventilation opening 11 and in that by inserting the container 4 into a system 1, or during or following said insertion, a radial pressure is exerted on the container 4 and acts on the ventilation opening 11 such that the, in particular hydraulic, diameter or opening cross-sectional area thereof is enlarged.

11. System 1, preferably designed to carry out a method according to any of the preceding aspects, the system having a chamber 14 into which a container 4 can be or is inserted, the container 4 comprising an extraction opening 9 and a ventilation opening 11 and the interior space of the container 4 comprising an extraction side 12 associated with the extraction opening 9 and a ventilation side 13 associated with the ventilation opening 11, which sides are separated from one another by the bag material 5, the chamber 14 tightly securing the extraction side 12 and the ventilation side 13 separately from one another, characterised in that the system 1 is designed to generate a preferably alternating differential pressure 25 between the extraction side 12 and the ventilation side 13 in order to peel the bag material 5 away from the inner wall 7 of the container 4, preferably in stages; and/or in that the system 1 comprises a pressure storage volume 30 and is designed to bring the pressure storage volume 30 to a pressure that is different from the pressure of the ventilation side 13, and the system 1 comprising a valve 21 that connects the pressure storage volume 30 to the ventilation side 13 by means of the chamber 14, and in that the system 1 comprises a pressure sensor 22 for identifying a pressure change when the connection is established; and/or in that the system 1 is designed to test the tightness of bags 2 provided in containers 4 by means of a differential pressure 25 between the extraction side 12 and the ventilation side 13, the system 1 comprising a pressure sensor 22 and an analysis device that is connected to the pressure sensor 22 and is designed to measure a change in a pressure on the ventilation side 13 and to compare the change with a threshold value 36; and/or in that the system 1 comprises a chamber 14 for or together with the container 4, the chamber 14 being designed, in particular by means of a tapering diameter, to produce a radial pressure on the wall 7 of the container 4 as a result of the container 4 being inserted into the chamber 14, or during or following said insertion, such that the, in particular hydraulic, diameter or the opening cross-sectional area of the ventilation opening 11 can be enlarged.

12. System according to aspect 11, characterised in that the system 1 comprises one or more containers 4, an outer face of a wall 7 of the container 4 preferably corresponding to an inner wall of the chamber 14, the system 1 in particular being designed to tightly secure a container 4 received in the chamber 14 such that the extraction side 12 and the ventilation side 13 are separated from one another by means of the bag 2; and/or in that the system 1 is designed for containers 4 to be introduced into the chamber 14 one after the other and is designed, once the peeling has taken place and/or the degree of peeling has been tested and/or the tightness has been tested, to reject containers 4 that do not reach a predefined degree of peeling or a predefined tightness.

13. Container 4 comprising an internal bag 2, in particular produced by means of a method according to any of aspects 1 to 6, characterised in that the bag 2 sticks to an inner face 6 of a wall 7 of the container 4 in a portion in an extension direction between the container base and extraction opening 9.

14. Computer program product, in particular for operating a system 1 according to any of aspects 10 to 13, comprising program code means, characterised in that when executed, the program code means carry out a method according to any of aspects 1 to 9, preferably by means of the system 1 according to any of aspects 10 to 13.

15. Use of a system 1 according to any of aspects 10 to 13 for producing a bag 2 in a container 4 and/or for testing a container 4 comprising an internal bag 2 according to any of aspects 1 to 9.

The aspects of the present invention or parts thereof can be combined with one another in any way, even if each combination has not been explained separately.

| LIST OF REFERENCE SIGNS | |
|---|---|
| 1 | System |
| 2 | Bag |
| 3 | Interior space |
| 4 | Container |
| 5 | Bag material |
| 6 | Inner face |
| 7 | Wall |
| 8 | Outer container |
| 9 | Extraction opening |
| 10 | Neck region |
| 11 | Ventilation opening |
| 12 | Extraction side |
| 13 | Ventilation side |
| 14 | Chamber |
| 15 | Extraction opening connector |
| 16 | Ventilation opening connector |
| 17 | Channel |
| 18 | Seal |
| 19 | Spike |
| 20 | Extraction-side valve |
| 21 | Ventilation-side valve |
| 22 | Pressure sensor |
| 23 | Extraction-side pressure device |
| 24 | Ventilation-side pressure device |
| 25 | Differential pressure |
| 26 | Extraction-side pressure curve |
| 26P | Blow-out pressure impulse |
| 27 | Ventilation-side pressure curve |
| 28 | Cycle |
| 29 | Period length |
| 30 | Pressure storage volume |
| 31 | Filling valve |
| 32 | Remaining-strip width |
| 33 | First segment |
| 34 | Second segment |
| 35 | Third segment |
| 36 | Threshold value |
| 37 | Fourth segment |
| A1 | Start of method |
| A2 | Chamber closure |
| A3 | Insertion test |
| A4 | Start of peeling cycle |
| A5 | Gross leak detection/analysis |
| A6 | Gross leak test |
| A7 | Peeling process aborted |
| A8 | Beginning of peeling cycle |
| A9 | Application of overpressure |
| A10 | Venting phase |
| A11 | Number check |
| A12 | Joining of container material |
| A13 | Chamber venting |
| A14 | End of peeling process |
| D1 | Start of method |
| D2 | Chamber closure |
| D3 | Insertion test |
| D4 | Gross leak test |
| D5 | Gross leak aborted |
| D6 | Degree of peeling test |
| D7 | Start of tightness test |
| D8 | Waiting time |
| D9 | Gross leak identification |
| D10 | Fine leak analysis |
| D11 | Ejection of container |
| D12 | End of method |
| F | Force |
| P12 | Extraction-side pressure |
| P13 | Ventilation-side pressure |
| V1 | Start of method |
| V2 | Chamber closure |
| V3 | Insertion test |
| V4 | Gross leak check |
| V5 | Test aborted |
| V6 | Volume determination |
| V7 | Preliminary gross leak test |
| V8 | Volume preparation |
| V9 | Separation |
| V10 | Determination of degree of peeling |
| V11 | Chamber ventilation |
| V12 | End of method |

The invention claimed is:

1. A method for forming a collapsible bag in an interior space of a container, comprising:
    peeling bag material away from an inner face of a wall of the container, the container comprising an extraction opening and a ventilation opening, and the interior space of the container comprising an extraction side associated with the extraction opening and a ventilation side associated with the ventilation opening, the extraction side and the ventilation side being separated from one another by the bag material, and the bag material being stuck to the inner face of the wall of the container when in an initial state;
    generating a differential pressure between the ventilation side and the extraction side and changing the differential pressure such that the bag material stuck to the wall detaches, thereby forming the bag, the differential pressure being generated first, upon which there is an overpressure on the ventilation side in relation to the extraction side, resulting in the bag material peeling away from the wall in part, and the differential pressure then being reversed in terms of sign or in terms of the direction of the differential pressure such that the bag material that has already peeled away is re-joined to the wall; and
    a further differential pressure is generated, upon which the pressure on the ventilation side is greater than on the extraction side such that the bag material in the already peeled-away portion is moved away from the wall first and then another portion of the bag material is detached from the wall.

2. The method according to claim 1, wherein the differential pressure is changed in an alternating manner such that the bag material stuck to the wall detaches in stages.

3. The method according to claim 1, wherein the differential pressure is changed cyclically, each cycle having at least two phases.

4. The method according to claim 3, wherein:
    in one phase, the pressure on the ventilation side is greater than the pressure on the extraction side or the differential pressure detaches the bag from the wall of the container, in another phase, the pressure on the ventilation side is lower than the pressure on the extraction side or the differential pressure presses the bag against the wall, and the differential pressure alternates.

5. The method according to claim 3, wherein the cycles each have a period length of more than 0.5 s, or less than 3 s.

6. The method according to claim 1, wherein the differential pressure is more than 100 kPa, or less than 400 kPa.

7. The method according to claim 1, wherein to produce the bag, a wall material forming the wall of the container, and the bag material are first made into the shape of the container directly abutting one another, the bag material sticking to the inner face of the wall of the container, and the bag then being formed by peeling away the bag material from the wall of the container.

8. The method according to claim 1, wherein a pressure storage volume is brought to a target pressure and then connected to the ventilation side such that the pressure between the pressure storage volume and the ventilation side is equalized, and the resultant pressure after the pressure equalization being measured as a parameter or to determine either the degree of peeling or the volume.

9. The method according to claim 1, wherein overpressure is applied to the extraction side compared with the ventilation side such that the bag is joined to the wall of the container, and in that together with or by means of the ventilation side, a closed test volume is generated, in which a pressure or pressure differential is identified following or depending on a test duration and is used as an indicator for the degree of tightness of the bag provided in the container.

10. The method of claim 1, wherein the container comprises a non-circular ventilation opening, wherein as a result of the container being inserted into a system, or during or following said insertion, a radial pressure is exerted on the container and acts on the ventilation opening such that the diameter or opening cross-sectional area thereof is temporarily enlarged, and wherein, by means of the temporarily enlarged diameter or the temporarily enlarged opening cross-sectional area, a pressure equalization through the ventilation opening is sped up.

11. A method for determining a degree to which a bag has peeled away from the inner face of the wall of a container, a volume by which the bag can be collapsed or a corresponding parameter, the container comprising an extraction opening and a ventilation opening, an interior space of the container comprising an extraction side associated with the extraction opening and a ventilation side associated with the ventilation opening, which sides are separated from one another by the bag, the method comprising:

bringing a pressure storage volume to a target pressure and then connecting the pressure to the ventilation side such that the pressure between the pressure storage volume and the ventilation side is equalized, and measuring the resultant pressure after the pressure equalization as a parameter or to determine either the degree of peeling or the volume.

12. The method according to claim 11, wherein the pressure storage volume is brought to an overpressure, the overpressure exceeding the ambient pressure.

13. The method according to claim 11, wherein the pressure storage volume corresponds to more than half or less than four times the volume of the container or bag.

14. The method according to claim 11, wherein when a valve between the ventilation side and the pressure storage volume is closed, the pressure storage volume is brought to overpressure, and the pressure storage volume is then connected to the ventilation side by opening the valve, the extraction side being vented or evacuated.

15. A system, comprising:
a chamber into which a container can be or is inserted, the container comprising an extraction opening and a ventilation opening and an interior space of the container comprising an extraction side associated with the extraction opening and a ventilation side associated with the ventilation opening, which sides are separated from one another by a bag material, the chamber tightly securing the extraction side and the ventilation side separately from one another,
wherein the system generates a differential pressure between the extraction side and the ventilation side in order to peel the bag material away from the inner wall of the container.

16. The system according to claim 15, wherein the differential pressure is alternating causing the bag material to be peeled off step-by-step.

17. The system of claim 15, wherein the chamber produces a radial pressure on the wall of the container as a result of the container being inserted into the chamber, or during or following said insertion, such that the diameter or the opening cross-sectional area of the ventilation opening is enlarged.

18. A system, comprising:
a chamber into which a container can be or is inserted, the container comprising an extraction opening and a ventilation opening and an interior space of the container comprising an extraction side associated with the extraction opening and a ventilation side associated with the ventilation opening, which sides are separated from one another by a bag material, the chamber tightly securing the extraction side and the ventilation side separately from one another,
wherein the system comprises a pressure storage volume and is designed to bring the pressure storage volume to a pressure that is different from the pressure of the ventilation side, and the system comprising a valve that connects the pressure storage volume to the ventilation side by means of the chamber, and wherein the system comprises a pressure sensor for identifying a pressure change when the connection is established.

19. The system according to claim 18, wherein the system is designed for containers to be introduced into the chamber one after the other and is designed to test a degree of peeling based on the pressure change and, once the degree of peeling has been tested, to reject containers that do not reach a predefined degree of peeling.

20. A system, comprising:
a chamber into which a container can be or is inserted, the container comprising an extraction opening and a ventilation opening and an interior space of the container comprising an extraction side associated with the extraction opening and a ventilation side associated with the ventilation opening, which sides are separated from one another by a bag material, the chamber tightly securing the extraction side and the ventilation side separately from one another,
wherein the system is designed to test the tightness of bags provided in containers by means of a differential pressure between the extraction side and the ventilation side, the system comprising a pressure sensor and an analysis device that is connected to the pressure sensor and is designed to measure a change in a pressure on the ventilation side and to compare the change with a threshold value.

21. The system according to claim 20, wherein the system is designed for containers to be introduced into the chamber one after the other and is designed to test a tightness of the bag and, once the tightness has been tested, to reject containers that do not reach a predefined tightness.

* * * * *